US008339808B2

(12) United States Patent
Nakahori

(10) Patent No.: US 8,339,808 B2
(45) Date of Patent: *Dec. 25, 2012

(54) SWITCHING POWER SUPPLY UNIT

(75) Inventor: Wataru Nakahori, Tokyo (JP)

(73) Assignee: TDK Corporation, Tokyo (JP)

(*) Notice: Subject to any disclaimer, the term of this patent is extended or adjusted under 35 U.S.C. 154(b) by 186 days.

This patent is subject to a terminal disclaimer.

(21) Appl. No.: 12/801,541

(22) Filed: Jun. 14, 2010

(65) Prior Publication Data

US 2010/0321960 A1   Dec. 23, 2010

(30) Foreign Application Priority Data

Jun. 19, 2009   (JP) .................................. 2009-146372

(51) Int. Cl.
   *H02M 3/335*   (2006.01)
(52) U.S. Cl. .......................................................... 363/17
(58) Field of Classification Search .................... 323/16, 323/17, 47, 56.02, 126, 132; 363/16, 17, 363/47, 56.02, 126, 132
   See application file for complete search history.

(56) References Cited

U.S. PATENT DOCUMENTS

| 1,758,680 | A | | 5/1930 | Andre |
| 4,628,426 | A | * | 12/1986 | Steigerwald ..................... 363/17 |
| 4,864,479 | A | | 9/1989 | Steigerwald et al. |
| 4,899,271 | A | | 2/1990 | Seiersen |
| 5,126,714 | A | | 6/1992 | Johnson |
| 5,663,876 | A | | 9/1997 | Newton et al. |
| 5,784,266 | A | | 7/1998 | Chen |
| 5,870,291 | A | | 2/1999 | Farrington et al. |
| 5,875,103 | A | | 2/1999 | Bhagwat et al. |
| 5,907,479 | A | * | 5/1999 | Leu ................................. 363/17 |
| 6,069,798 | A | | 5/2000 | Liu |
| 6,084,792 | A | | 7/2000 | Chen et al. |
| 6,163,466 | A | | 12/2000 | Davila, Jr. et al. |
| 6,198,644 | B1 | | 3/2001 | Minamisawa |
| 6,504,735 | B2 | | 1/2003 | Negru et al. |
| 6,535,407 | B1 | | 3/2003 | Zaitsu |

(Continued)

FOREIGN PATENT DOCUMENTS

EP   1 976 104 A2   10/2008

(Continued)

OTHER PUBLICATIONS

Search Report issued in corresponding European Patent Application No. 10006297.5, dated Oct. 26, 2010.

*Primary Examiner* — Jue Zhang
(74) *Attorney, Agent, or Firm* — Oliff & Berridge, PLC

(57) ABSTRACT

The switching power supply unit includes: a transformer having a primary winding and two secondary windings; and a rectifying-smoothing circuit having two rectifying elements, three choke coils and a capacitive element. A first rectifying element is between a junction of ends of the first secondary winding and the second choke coil, and one end of the capacitive element. A second rectifying element is between a junction of ends of the second secondary winding and the third choke coil, and the one end of the capacitive element. The other end of the first secondary winding and the other end of second secondary winding are connected to the one end of the first choke coil. The other end of the first choke coil, the other end of the second choke coil, and the other end of the third choke coil are connected to the other end of the capacitive element.

13 Claims, 21 Drawing Sheets

U.S. PATENT DOCUMENTS

| | | |
|---|---|---|
| 6,549,436 B1 | 4/2003 | Sun |
| 6,590,791 B1 | 7/2003 | Zhou et al. |
| 6,807,069 B2 * | 10/2004 | Nieminen et al. .............. 363/17 |
| 6,856,521 B1 | 2/2005 | Chen et al. |
| 6,873,237 B2 | 3/2005 | Chandrasekaran et al. |
| 6,906,931 B1 | 6/2005 | Batarseh et al. |
| 6,944,033 B1 * | 9/2005 | Xu et al. ........................ 363/17 |
| 6,982,887 B2 | 1/2006 | Batarseh et al. |
| 7,012,414 B1 | 3/2006 | Mehrotra et al. |
| 7,016,203 B2 | 3/2006 | Xu et al. |
| 7,023,709 B2 | 4/2006 | Lipcsei et al. |
| 7,046,523 B2 | 5/2006 | Sun et al. |
| 7,099,161 B2 | 8/2006 | Yan et al. |
| 7,110,265 B2 | 9/2006 | Liu et al. |
| 7,158,392 B2 | 1/2007 | Hosokawa et al. |
| 7,193,496 B2 | 3/2007 | Nakahori |
| 7,196,916 B2 | 3/2007 | Batarseh et al. |
| 7,209,024 B2 | 4/2007 | Nakahori |
| 7,239,530 B1 | 7/2007 | Djekic et al. |
| 7,280,026 B2 | 10/2007 | Chandrasekaran et al. |
| 7,289,329 B2 | 10/2007 | Chen et al. |
| 7,295,094 B2 | 11/2007 | Jitaru et al. |
| 7,295,448 B2 | 11/2007 | Zhu |
| 7,304,866 B2 | 12/2007 | Lipcsei et al. |
| 7,307,857 B2 | 12/2007 | Liu et al. |
| 7,313,003 B2 | 12/2007 | Nakahori et al. |
| 7,362,598 B2 | 4/2008 | Schaible et al. |
| 7,365,995 B2 | 4/2008 | Lipcsei et al. |
| 7,405,955 B2 | 7/2008 | Nakahori |
| 7,414,869 B2 | 8/2008 | Nakahori |
| 7,417,875 B2 | 8/2008 | Chandrasekaran et al. |
| 7,463,498 B1 | 12/2008 | Djekic et al. |
| 7,468,649 B2 | 12/2008 | Chandrasekaran |
| 7,471,524 B1 | 12/2008 | Batarseh et al. |
| 7,623,362 B2 | 11/2009 | Nakahori |
| 7,876,067 B2 * | 1/2011 | Greenfeld et al. ............ 363/21.1 |
| 8,004,867 B2 * | 8/2011 | Nakahori ........................ 363/17 |
| 8,031,494 B2 * | 10/2011 | Brkovic ......................... 363/49 |
| 2008/0239759 A1 | 10/2008 | Nakahori |
| 2008/0247195 A1 | 10/2008 | Nakahori |
| 2009/0079402 A1 | 3/2009 | Nakahori |
| 2009/0109709 A1 | 4/2009 | Nakahori |
| 2009/0168461 A1 | 7/2009 | Nakahori |

FOREIGN PATENT DOCUMENTS

| | | |
|---|---|---|
| JP | A-11-187657 | 7/1999 |
| JP | A-2005-038872 | 2/2005 |
| JP | A-2007-088131 | 4/2007 |
| JP | A-2007-236091 | 9/2007 |
| JP | A-2007-236092 | 9/2007 |
| JP | A-2008-187801 | 8/2008 |
| JP | A-2008-199720 | 8/2008 |
| JP | A-2008-199721 | 8/2008 |
| JP | A-2009-135320 | 6/2009 |
| WO | WO 2007/017415 | 2/2007 |

* cited by examiner

SWITCHING POWER SUPPLY UNIT

BACKGROUND OF THE INVENTION

1. Field of the Invention

The present invention relates to a switching power supply unit in which a switched output obtained by switching a DC input voltage is taken out in an output winding of a power converting transformer.

2. Description of the Related Art

Hitherto, various types of DC-DC converters have been proposed as a switching power supply unit and provided for practical use. Many of them are of a type in which a DC input voltage is switched with a switching operation by a switching circuit (inverter circuit) that is connected to a primary winding of a power converting transformer (transformer device), and the switched output (inverter output) is taken out in a secondary winding of the power converting transformer (transformer). The voltage appearing in the secondary winding in accordance with the switching operation of the switching circuit is rectified by a rectifier circuit, then is converted into a DC current by a smoothing circuit and outputted.

In related arts, this sort of switching power supply unit employs as a rectifier circuit a circuit of a center tap type (refer to Japanese Patent Publication Application No. 2007-60890 for example) and a circuit of a current doubler type (for example, refer to U.S. Pat. No. 4,899,271 and Japanese Patent Publication Application No. 1999-187657).

SUMMARY OF THE INVENTION

Here, when a rectifier circuit of a center tap type is employed, output currents are all flown into one choke coil provided in a smoothing circuit. Accordingly, the operating point of the choke coil gets so high that it easily exceeds the limiting value of AL-Value and NI-Limit (DC superposing characteristic of the choke coil deteriorates and inductance is liable to be saturated). Such a high operating point of the choke coil may cause enlargement in size of the choke coil, inevitably lowered inductance thereof or an increase of power loss thereof. Here, AL-Value is a parameter that indicates the relationship of the number of turn N of a coil and inductance L [nH] (parameter indicating the saturation point of a coil), which is expressed by AL-Value=$L/N^2$. Meanwhile, NI-Limit means the limitation value of "N*I" in a relational expression "magnetic flux=N*I" (current value to be flown through a coil).

Meanwhile, when a rectifier circuit of a current doubler type is employed, the output current is split into two choke coils provided in the smoothing circuit. As a result, the operating point of each choke coil may be lowered a little more than the case of the above-mentioned center tap type. However, recently, since the amount of current (output current) dealt-with in the switching power supply unit is getting larger, it has been desired to more reduce the operating point of choke coils.

It is desirable to provide a switching power supply unit in which the operating point of an output power smoothing choke coil may be more lowered than ever before.

A first switching power supply unit according to an embodiment of the present invention converts a DC input voltage inputted from an input terminal pair into a DC output voltage, and outputs the generated DC output voltage from an output terminal pair. The first switching power supply unit includes a transformer, an inverter circuit and a capacitive element. The transformer has a primary winding arranged on the input terminal pair side and a first and a second secondary windings arranged on the output terminal pair side. The first and a second secondary windings are connected in series to each other. The inverter circuit is arranged between the input terminal pair and the primary winding, and includes switching elements. The first rectifying-smoothing circuit is arranged between the output terminal pair and the first and second secondary windings, and includes first and second rectifying elements, first to third choke coils, and a capacitive element arranged between the output terminal pair. Here, the first rectifying element is arranged between a first junction and one end of the capacitive element, the first junction being defined as a junction of one end of the first secondary winding and one end of the second choke coil. The second rectifying element is arranged between a second junction and the one end of the capacitive element, the second junction being defined as a junction of one end of the second secondary winding and one end of the third choke coil. A third junction is connected to the one end of the first choke coil, the third junction being defined as a junction of the other end of the first secondary winding and the other end of second secondary winding. A fourth junction is connected to the other end of the capacitive element, the fourth junction being defined as a junction of the other end of the first choke coil, the other end of the second choke coil and the other end of the third choke coil.

In the first switching power supply unit according to an embodiment of the present invention, a DC input voltage inputted from input terminal pair is switched in an inverter circuit to generate an AC voltage. Then, the AC voltage is transformed by transformer and then rectified by rectification smoothing circuit. Thus a DC output voltage is outputted from output terminal pair. Here, in the rectification smoothing circuit, the first rectifier device is arranged between a connection point of one ends of the first secondary winding and the second choke coil and one end of the capacitive element. The second rectifier device is arranged between a connection point of one ends of the second secondary winding and the third choke coil and one end of the capacitive elements. A connection point of the other ends of the first and second secondary windings is connected to one end of the first choke coil, and a connection point of the other ends of the first to third choke coils is connected to the other end of the capacitive element. In this configuration, output currents are always split into the three choke coils (the first to third choke coils) in the rectification smoothing circuit. As a result, an amount of current dealt-with in each choke coil is reduced.

According to the first switching power supply unit of an embodiment of the present invention, when inductance of the first to third choke coils are defined as L1, L2 and L3 respectively, it is preferred that they satisfy the expression L1<L2=L3. In this configuration, output currents may be easily split into the three choke coils.

In the first switching power supply unit according to an embodiment of the present invention, a cathode of the first rectifying element may be connected to the first junction while an anode thereof may be connected to the one end of the capacitive element, and a cathode of the second rectifying element may be connected to the second junction while an anode thereof may be connected to the one end of the capacitive element. Namely, the first and second rectifier devices may be connected each other in anode common connection.

Alternatively, an anode of the first rectifying element may be connected to the first junction while a cathode thereof may be connected to the one end of the capacitive element, and an anode of the second rectifying element may be connected to the second junction while a cathode thereof may be connected to the one end of the capacitive element. Namely, the first and second rectifier devices may be connected to each other in cathode common connection.

According to the first switching power supply unit of an embodiment of the present invention, the inverter circuit may be a switching circuit of full bridge type, which is configured to include four switching elements.

In the first switching power supply unit according to a first embodiment of the present invention, the transformer may include a magnetic core, a first conductive member and a second conductive member. The magnetic core includes two base-plates facing each other and four legs provided between the two base-plates to couple the two base-plates together. The four legs include a first pair of legs on a first diagonal line and a second pair of legs on a second diagonal line, where the first and second diagonal lines intersect each other in a plane along facing surfaces of the two base-plates. The first conductive member has through-holes allowing the four respective legs to pass therethrough, and configures the primary winding which is wound around the legs. The second conductive member has through-holes allowing the four respective legs to pass therethrough, and configures the first and second secondary windings which are wound around the legs.

In the first switching power supply unit according to a second embodiment of the present invention, the transformer may include a magnetic core, a first conductive member, a second conductive member and a third conductive member. The magnetic core includes two base-plates facing each other and four legs provided between the two base-plates to couple the two base-plates together. The four legs include a first pair of legs on a first diagonal line and a second pair of legs on a second diagonal line, and the first and second diagonal lines intersect each other in a plane along facing surfaces of the two base-plates. The first conductive member has through-holes allowing the four respective legs to pass therethrough, and configures the primary winding which is wound around the legs. The second conductive member has through-holes allowing the four respective legs to pass therethrough, and configures the first secondary winding which is wound around the legs. The third conductive member has through-holes allowing the four respective legs to pass therethrough, and configures the second secondary winding which is wound around the legs.

In the first and second embodiments, the primary winding may be wound around so that closed magnetic paths are formed inside the magnetic core from the four legs to the two base-plates due to currents which flow through the primary winding, and among four legs, a first couple of magnetic fluxes respectively generated inside the first couple of legs are both directed in a first direction, and a second couple of magnetic fluxes respectively generated inside the second couple of legs are both directed in a second direction which is opposite to the first direction. Alternatively, the primary winding may be wound around so that closed magnetic paths are formed inside the magnetic core from the four legs to the two base-plates due to currents which flow through the primary winding, the four closed magnetic paths each passing through both adjacent two of the four legs and the two base-plates and then returning. In this configuration, reduction of flux density in magnetic core is achieved due to the dispersion of flux path compared with the case where a U-shaped core is employed, thereby reducing the core loss. Further since heat radiation path is expanded compared with the case of an E-shaped core, cooling of the primary and secondary windings gets more easy as with the cooling of the magnetic core itself. As a result, cost reduction is achieved while increasing reliability of product.

A second switching power supply unit according to an embodiment of the present invention converts a DC input voltage inputted from an input terminal pair into a DC output voltage, and outputs the generated DC output voltage from an output terminal pair. The second switching power supply unit includes a transformer, an inverter circuit, a first rectifying-smoothing circuit, and a second rectifying-smoothing circuit. The transformer has a primary winding arranged on the input terminal pair side and first to fourth secondary windings arranged on the output terminal pair side. The first to fourth secondary windings are connected in series to each other. The inverter circuit is arranged between the input terminal pair and the primary winding, and includes switching elements. The first rectifying-smoothing circuit is arranged between the output terminal pair and the first and second secondary windings, and includes first and second rectifying elements, first to third choke coils, and a first capacitive element arranged between the output terminal pair. The second rectifying-smoothing circuit is arranged between the output terminal pair and the third and fourth secondary windings in parallel with the first rectifying-smoothing circuit, and includes third and fourth rectifying elements, fourth to sixth choke coils, and a second capacitive element arranged between the output terminal pair. Here, the first rectifying element is arranged between a first junction and one end of the capacitive element, the first junction being defined as a junction of one end of the first secondary winding and one end of the second choke coil. The second rectifying element is arranged between a second junction and the one end of the capacitive element, the second junction being defined as a junction of one end of the second secondary winding and one end of the third choke coil. A third junction is connected to the one end of the first choke coil, the third junction being defined as a junction of the other end of the first secondary winding and the other end of second secondary winding. A fourth junction is connected to the other end of the capacitive element, the fourth junction being defined as a junction of the other end of the first choke coil, the other end of the second choke coil and the other end of the third choke coil. The third rectifying element is arranged between a fifth junction and one end of the second capacitive element, the fifth junction being defined as a junction of one end of the third secondary winding and one end of the fifth choke coil. The fourth rectifying element is arranged between a sixth junction and the one end of the second capacitive element, the sixth junction being defined as a junction of one end of the fourth secondary winding and one end of the sixth choke coil. A seventh junction is connected to the one end of the fourth choke coil, the seventh junction being defined as a junction of the other end of the third secondary winding and the other end of fourth secondary winding. An eighth junction is connected to the other end of the first capacitive element, the eighth junction being defined as a junction of the other end of the fourth choke coil, the other end of the fifth choke coil and the other end of the sixth choke coil.

In the second switching power supply unit according to an embodiment of the present invention, the transformer may include a magnetic core, a first conductive member, a second conductive member and a third conductive member. The magnetic core includes two base-plates facing each other and four legs provided between the two base-plates to couple the two base-plates together. The four legs include a first pair of legs on a first diagonal line and a second pair of legs on a second diagonal line, where the first and second diagonal lines intersect each other in a plane along facing surfaces of the two base-plates. The first conductive member has through-holes allowing the four respective legs to pass therethrough, and configures the primary winding which is wound around the legs. The second conductive member has through-holes allowing the four respective legs to pass therethrough, and configures the first and second secondary windings which are wound around the legs. The third conductive member has through-holes allowing the four respective legs to pass therethrough, and configures the third and fourth secondary windings which are wound around the legs.

In the second switching power supply unit according to an embodiment of the present invention, the primary winding may be wound around so that closed magnetic paths are formed inside the magnetic core from the four legs to the two base-plates due to currents which flow through the primary winding, and among four legs, a first couple of magnetic fluxes respectively generated inside the first couple of legs are both directed in a first direction, and a second couple of magnetic fluxes respectively generated inside the second couple of legs are both directed in a second direction which is opposite to the first direction. Alternatively, the primary winding may be wound around so that closed magnetic paths are formed inside the magnetic core from the four legs to the two base-plates due to currents which flow through the primary winding, the four closed magnetic paths each passing through both adjacent two of the four legs and the two base-plates and then returning. In this configuration, reduction of flux density in magnetic core is achieved due to the dispersion of flux path compared with the case where a U-shaped core is employed, thereby reducing the core loss. Further since heat radiation path is expanded compared with the case of an E-shaped core, cooling of the primary and secondary windings gets more easy as with the cooling of the magnetic core itself. As a result, cost reduction is achieved while increasing reliability of product.

In the switching power supply unit according to an embodiment of the present invention, in a rectification smoothing circuit, the first rectifier device is arranged between a connection point of one ends of the first secondary winding and the second choke coil and one end of the capacitive element, the second rectifier device is arranged between a connection point of one ends of the second secondary winding and the third choke coil and one end of the capacitive element, and a connection point of the other ends of the first and second secondary windings is connected to one end of the first choke coil, and a connection point of the other ends of the first to third choke coils is connected to the other end of the capacitive element. In this manner, the amount of current dealt-with in each choke coil is reduced and DC superposing characteristic of the choke coils may be reduced (inductance becomes less likely to be saturated). Therefore, the operating point of the output power smoothing choke coil may be more lowered than ever. Thereby, a smaller choke coil with high inductance is available, while the power loss in the choke coil may be reduced.

Other and further objects, features and advantages of the invention will appear more fully from the following description.

DESCRIPTION OF THE PREFERRED EMBODIMENTS

Embodiment of the invention will be described in detail hereinbelow with reference to the drawings.
[Embodiment of the Invention]
(Whole Configuration Example of Switching Power Supply Unit)

Figure 1:
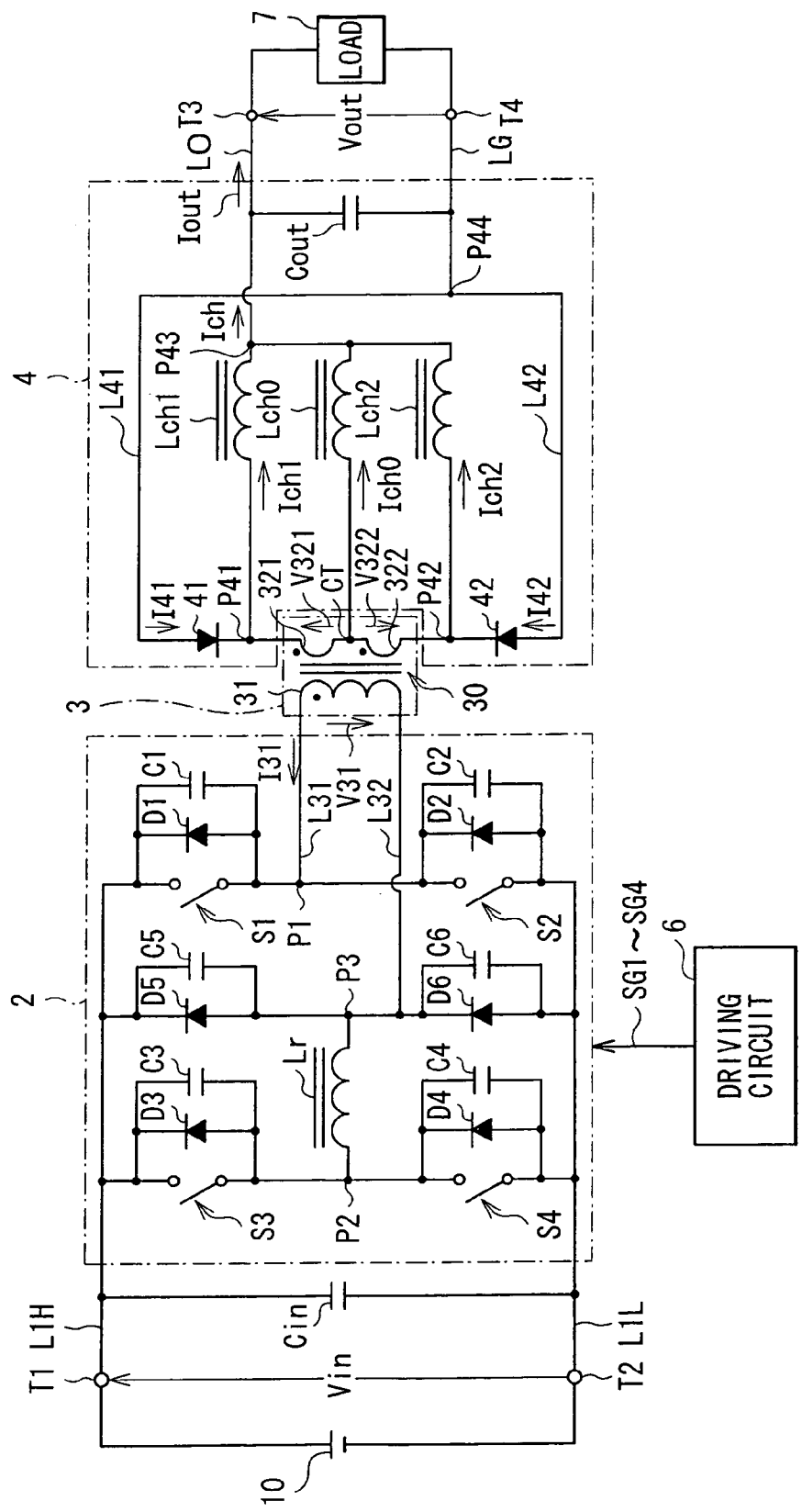
FIG. 1 is a circuit diagram showing a configuration of a switching power supply unit according to an embodiment of the present invention.

FIG. 1 is a circuit diagram of a switching power supply unit according to an embodiment of the present invention. The switching power supply unit functions as a DC-DC converter, in which higher DC input voltage Vin supplied from a high voltage battery 10 is converted into a lower DC output voltage Vout and supplied to a low voltage battery which is not illustrated so that a load 7 may be driven.

The switching power supply unit includes an input smoothing capacitor Cin provided between a primary side high voltage line L1H and a primary side low voltage line L1L, an inverter circuit 2, and a transformer 3 having a magnetic core 30, a first winding (primary winding) 31, and second windings (secondary windings) 321 and 322. The higher DC input voltage Vin supplied (output) from the high voltage battery 10 is applied across an input terminal T1 of the primary side high voltage line L1H and an input terminal T2 of the primary side low voltage line L1L. The switching power supply unit also includes a rectification smoothing circuit 4 provided on the secondary side of the transformer 3 and a driving circuit 6 that drives the inverter circuit 2.

The input smoothing capacitor Cin smoothes the DC input voltage Vin inputted from input terminals T1 and T2.

The inverter circuit 2 has four switching elements S1 to S4, and capacitors C1 to C4 and diodes D1 to D4 connected in parallel with the switching elements S1 to S4 respectively, and is configured as a switching circuit of a full-bridge type. In the diodes D1 to D4, each cathode is arranged on the primary side high voltage line L1H while the anode is arranged on the primary side low voltage line L1L in their reversely-connected state. In addition, the inverter circuit 2 has reversely-connected diodes D5 and D6 and capacitors C5 and C6 connected in parallel to the diodes D5 and D6 respectively. One end of the switching element S1 and one end of the switching element S2 are connected to each other at a connection point P1, and one end of the switching element S3 and one end of the switching element S4 are connected to each other at a connection point P2. The anode of the diode D5 and the cathode of the diode D6 are mutually connected in a connection point P3. The other ends of the switching elements S1 and S3 and the cathode of the diode D5 are connected mutually, and are connected to the input terminal T1 via the primary side high voltage line L1H. The other ends of the switching elements S2 and S4 and the anode of the diode D6 are connected mutually, and are connected to the input terminal T2 via the primary side low voltage line L1L. The primary winding 31 of the transformer 3 to be described later is arranged between the connection points P1 and P3, and a resonance inductor Lr is arranged between the connection points P2 and P3. This resonance inductor Lr is formed by using leakage inductance of the transformer 3, for example, and forming an LC resonance circuit together with the capacitors C1 to C4 provided in the inverter circuit 2. Thus a short-circuit loss in the switching elements S1 to S4 may be suppressed as described later by utilizing the resonance characteristic of the LC resonance circuit. In this configuration, the inverter circuit 2 converts the DC input voltage Vin applied across the input terminals T1 and T2 into an AC voltage in accordance with drive signals SG1 to SG4 supplied from the driving circuit 6, and outputs it therefrom.

As the switching elements S1 to S4, such switching element as a field effect transistor (MOS-FET; Metal Oxide Semiconductor-Field Effect Transistor) and an IGBT (Insulated Gate Bipolar Transistor) are used, for example. When the MOS-FETs is employed as the switching element, the above-mentioned capacitors C1 to C4 and diodes D1 to D4 may be constituted from parasitic capacitance or parasitic diodes of the MOS-FETs. Alternatively, the above-mentioned capacitors C1 to C4 may be constituted from junction capacitance of the diodes D1 to D4. With such configuration, there is no need of separately providing the capacitors C1 to C4 and the diodes D1 to D4 in addition to the switching elements, thereby simplifying the circuit configuration.

The transformer 3 has the magnetic core 30, the primary winding 31 and the two secondary windings 321 and 322. As a magnetic core 30, various type of cores such as an E-shaped core (EE core, EI core, etc.) and a U-shaped core (UU core, UI core, etc.) may be used, for example. On end of the primary winding 31 is connected to the connection point P1 via the connection line L31 and the other end thereof is connected to the connection point P3 via the connection line L32. Meanwhile, the secondary windings 321 and 322 are connected in series to each other. Specifically, one end of the secondary winding 321 is connected to the cathode of the rectifier diode 41 and one end of a choke coil Lch1, which are to be described later, in a connection point P41. One end of the secondary winding 322 is connected to the cathode of the rectifier diode 42 and one end of a choke coil Lch2, which are to be described later, in a connection point P42. The other ends of the secondary windings 321 and 322 are mutually connected at a center tap CT, and a wiring led therefrom is connected to a choke coil Lch0 to be described later. This transformer 3 stepdowns the AC voltage (AC voltage inputted into the transformer 3) which is generated by the inverter circuit 2, and outputs from each end portion of the secondary windings 321 and 322 an AC voltage of a phase shifted by 180 degrees each other. In this configuration, the level of the voltage drop is determined based on the turns ratio between the primary winding 31 and the secondary windings 321 and 322.

The rectification smoothing circuit 4 has the two rectifier diodes 41 and 42, three choke coils Lch0, Lch1 and Lch2, and an output smoothing capacitor Cout. The cathode of the rectifier diode 41 is connected to the secondary winding 321 and one end of choke coil Lch1 in the connection point P41, and the anode thereof is connected to the connection point P44 on a ground line LG via a connection line L41. The cathode of the rectifier diode 42 is connected to the secondary winding 322 and one end of the choke coil Lch2 in the connection point P42, and the anode thereof is connected to the connection point P44 via a connection line L42. Namely, the anodes of these rectifier diodes 41 and 42 are connected to each other in the connection point P44 and led to the ground line LG. That is, the rectifier circuit constituted from the rectifier diodes 41 and 42 has a configuration of anode-common-connection, in which the rectifier diodes 41 and 42 rectify the respective half wave periods of the outputted AC voltages supplied from the transformer 3.

Meanwhile, the other ends of the three choke coils Lch0 to Lch2 are respectively connected to one another. Specifically, one end of the choke coil Lch0 is connected to center tap CT, one end of the choke coil Lch1 is connected to the connection point P41, one end of choke coil Lch2 is connected to the connection point P42. The other ends of these choke coils Lch0 to Lch2 are connected to one another at the connection point P43 provided on the output line LO. The output smoothing capacitor Cout is connected between the output line LO (connection point P43) and the ground line LG (connection point P44). An output terminal T3 is provided at the end of the output line LO while an output terminal T4 is provided at the end of the ground line LG. In this configuration, the smoothing circuit constituted from the choke coils Lch0 to Lch2 and the smoothing capacitor Cout smoothes an voltage rectified by the rectifier diodes 41 and 42 to generate a DC output voltage Vout and outputs the DC output voltage Vout from the output terminals T3 and T4 to a low-voltage battery (not shown) for charging.

The driving circuit 6 is provided to drive the switching elements S1 to S4 in the inverter circuit 2. Specifically, the driving circuit 6 supplies drive signals SG1 to SG4 to the switching element S1 to S4 respectively to take a control of on/off operation of the switching elements S1 to S4. This driving circuit 6 also carries out a phase control on the switching elements S1 to S4 to properly set the switching phase difference, thereby stabilizing the DC output voltage Vout.

Here, the input terminals T1 and T2 correspond to a specific example of "an input terminal pair" of the invention, and the output terminals T3 and T4 correspond to a specific example of "an output terminal pair" of the invention. The secondary winding 321 corresponds to "a first secondary winding" of the invention, and the secondary winding 322 corresponds to a specific example of "a second secondary winding" of the invention. The rectifier diode 41 corresponds to a specific example of "a first rectifier device" of the invention, and the rectifier diode 42 corresponds to a specific example of "a second rectifier device" of the invention. The choke coil Lch0 corresponds to a specific example of "a first choke coil" of the invention, the choke coil Lch1 corresponds to a specific example of "a second choke coil" of the invention, and the choke coil Lch2 corresponds to a specific example of "a third choke coil" of the invention. The output smoothing capacitor Cout corresponds to a specific example of "a capacitive element" of the invention.

Subsequently, functions and effects of the switching power supply unit according to the embodiment will be explained.

(1. Fundamental Operation)

In this switching power supply unit, a DC input voltage Vin supplied from the input terminals T1 and T2 are switched in the inverter circuit 2 to generate an AC voltage, and this AC voltage is supplied to the primary winding 31 of the transformer 3. Then, in the transformer 3, the AC voltage is transformed and outputted from the secondary windings 321 and 322.

In the rectification smoothing circuit 4, the AC voltage outputted from the transformer 3 is rectified by the rectifier diodes 41 and 42. Thereby, a rectified output is generated between the center tap CT (output line LO) and the connection point P44 (ground line LG) of the rectifier diodes 41 and 42. This rectified output is smoothed by the three choke coils Lch0 to Lch2 and the output smoothing capacitor Cout, and is outputted as a DC output voltage Vout from the output terminals T3 and T4. Then the DC output voltage Vout is supplied to a not-illustrated low voltage battery for power supply so that the load 7 is driven.

(2. Detailed Operation)

Subsequently, configuration of the switching circuit will be described in detail according to the present embodiment with reference to FIGS. 2A to 9.

Here, FIGS. 2A to 2I are timing waveforms showing a voltage waveform or a current waveform of each part of the switching power supply unit of FIG. 1. FIGS. 2A to 2D represent voltage waveforms of the driving signals SG1 to SG4. FIG. 2E represent a current waveform or a voltage waveform of the output current Iout, the output electric voltage Vout and the choke current Ich(=Ich0+Ich1+Ich2) as shown in FIG. 1, where the choke current Ich corresponds to the total value of choke currents Ich0, Ich1, and Ich2 flowing through the chokes Lch0 to Lch2, respectively. FIG. 2F represents a current wave form of the choke currents Ich0, Ich1 and Ich2 flowing through these chokes Lch0 to Lch2, respectively. FIG. 2G is a voltage waveform of voltages V321 and V322 across both ends of the secondary windings 321 and 322. FIG. 2H represents a voltage waveform of the voltage V31 across both ends of the primary winding 31 and a current waveform of the electric current I31 flowing through the both ends thereof. FIG. 2I represents current waveforms of electric currents I41 and I42 respectively flowing through the rectifier diodes 41 and 42. Here, as for the voltage direction and current direction, those indicated by arrows in FIG. 1 are defined as a positive direction.

Moreover, FIGS. 3 to 9 show an operating state of the switching power supply unit on each timing (timing t0 to t6 and timing t0'(t6) to t6'(t0)) indicated in FIGS. 2A to 2I. In the operation shown in FIGS. 2A to 2I, the operation of the timing t0 to t6 (first half cycle) and the operation of the timing t0' (t6) to t6' (t0) (latter half cycle) are combined as one cycle of operation.

(2-1. Operation of the First Half Cycle)

First, the operation of the first half cycle will be explained with reference to FIGS. 2A to 9.

As for the driving signals SG1 to SG4 (see FIGS. 2A to 2D) of the switching elements S1 to S4, it is known that these switching elements are classified into two types of switching element pairs. Specifically, the switching elements S1 and S2 are controlled to turn on at fixed timings on the temporal axis and therefore called "phase-fixed switching element." Meanwhile, the switching element S3 and S4 are controlled to turn on at variable timings on the temporal axis and therefore called "phase-shift switching element."

The switching elements S1 to S4 are driven at a timing and in combination so that the input terminals T1 and T2 across which the DC input voltage Vin is applied are never electrically short-circuited in any switching operation. Specifically, the switching elements S3 and S4 (phase-shift switching element) are not turned on simultaneously, and the switching elements S1 and S2 (phase-fixed switching element) are not turned on simultaneously. A time interval required to avoid simultaneous turns-on of the switching elements is called dead time "Td" (see FIGS. 2A and 2D).

The switching elements S1 and S4 have a period in which they are turned on simultaneously, and in the simultaneously turned-on period, the primary winding 31 of the transformer 3 is excited. In addition, the switching elements S1 and S4 are operated so as to have a switching phase difference φ relative to the switching element S1 (phase-fixed switching element) (see FIGS. 2A and 2D). Similarly, the switching element S2 and S3 have a period in which they are simultaneously turned on, and in the simultaneously turned-on period, the primary winding 31 of the transformer 3 is excited in a direction opposite to the above. The switching elements S2 and S3 are operated so as to have a switching phase difference φ relative to the switching element S2 (phase-fixed switching element) (see FIGS. 2B and 2C). Further, when the switching phase difference φ between the switching elements S1 and S4 and the switching phase difference φ between the switching elements S2 and S3 are controlled respectively, the period in which the switching elements S1 and S4 are simultaneously turned on and the period in which the switching elements S2 and S3 are simultaneously turned on are respectively varied. Accordingly, the duty ratio of the AC voltage applied to the primary winding 31 of the transformer 3 changes, and the DC output voltage Vout is stabilized.

Figure 2:
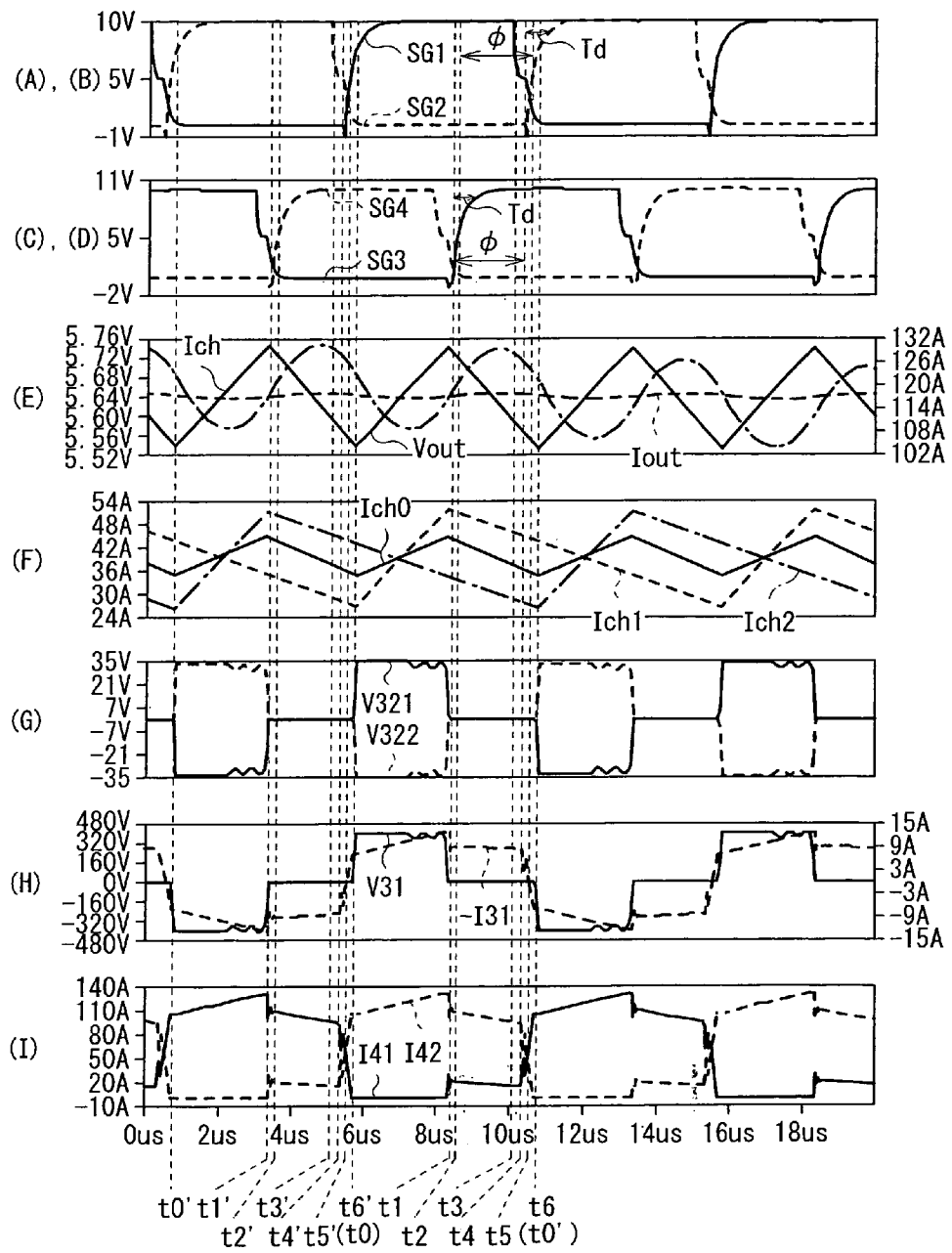
FIGS. 2A to 2I are timing waveforms showing operation of the switching power supply unit of FIG. 1.
Figure 3:
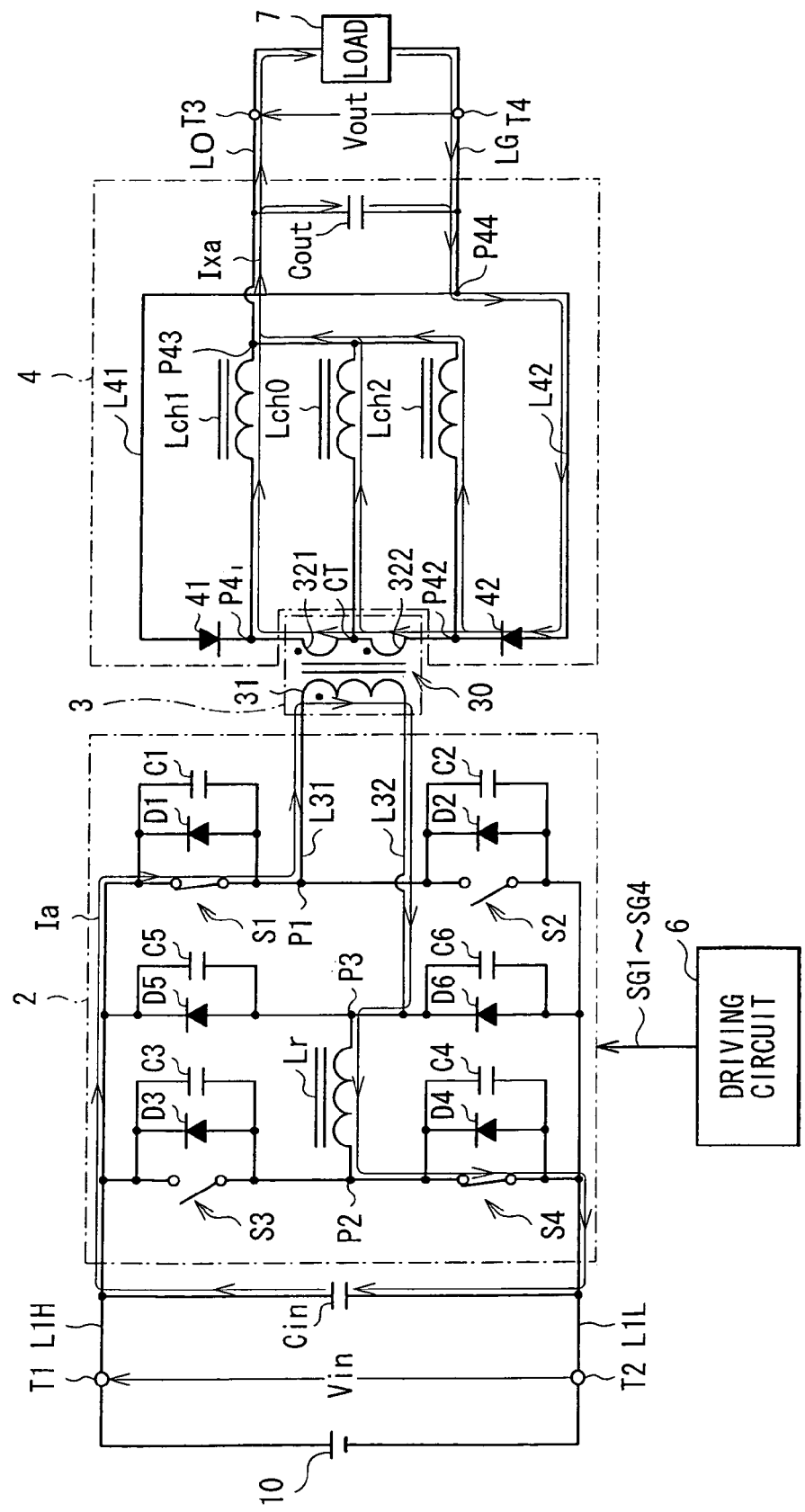
FIG. 3 is a circuit diagram for explaining the operation of the switching power supply unit of FIG. 1.

First, in the period of the timing t0 to t1 as shown in FIG. 3, the switching elements S1 and S4 are turned-on (see FIGS. 2A and 2D), and the switching elements S2 and S3 are turned off (see FIGS. 2B and 2C). Therefore, a loop current Ia as shown in FIG. 3 flows in the inverter circuit 2 so that the resonance inductor Lr is excited and an electric power is transmitted from the primary side to the secondary side of the transformer 3. Therefore, a loop current Ixa flows to the secondary side of the transformer 3 via the rectifier diode 42, the three choke coils Lch0 to Lch2 and the output smoothing capacitor Cout so that the load 7 is driven (see FIGS. 2E, 2F and 2I).

Figure 4:
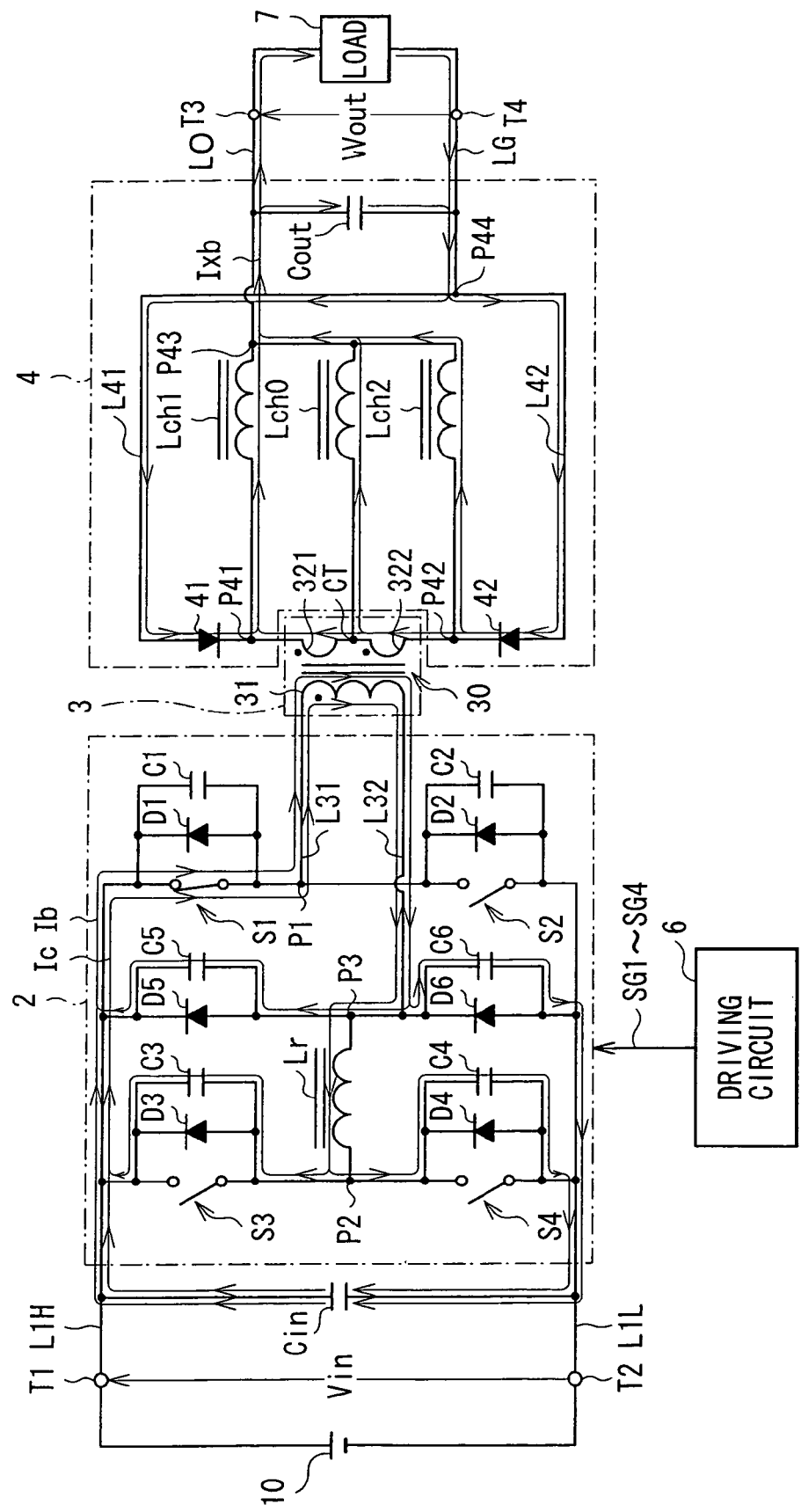
FIG. 4 is a circuit diagram for explaining the operation of the switching power supply unit subsequent to FIG. 3.

Next, in the period of the timing t1 to t2 as shown in FIG. 4, the switching element S4 is turned off at the timing of t1 (see FIG. 2D). Then, the capacitors C3 and C4 and the resonance inductor Lr collaborate to construct an LC resonance circuit that implements an LC resonance operation. Accordingly, while the loop currents Ib and Ic as shown in FIG. 4 flow and the capacitors C3 and C5 are discharged, the capacitors C4 and C6 are charged. Meanwhile, the loop current Ixb flows to the secondary side of the transformer 3 via the rectifier diode 41 or 42, the three choke coils Lch0 to Lch2 and the output smoothing capacitor Cout, and the load 7 is driven (see FIGS. 2E, 2F and 2I).

Figure 5:
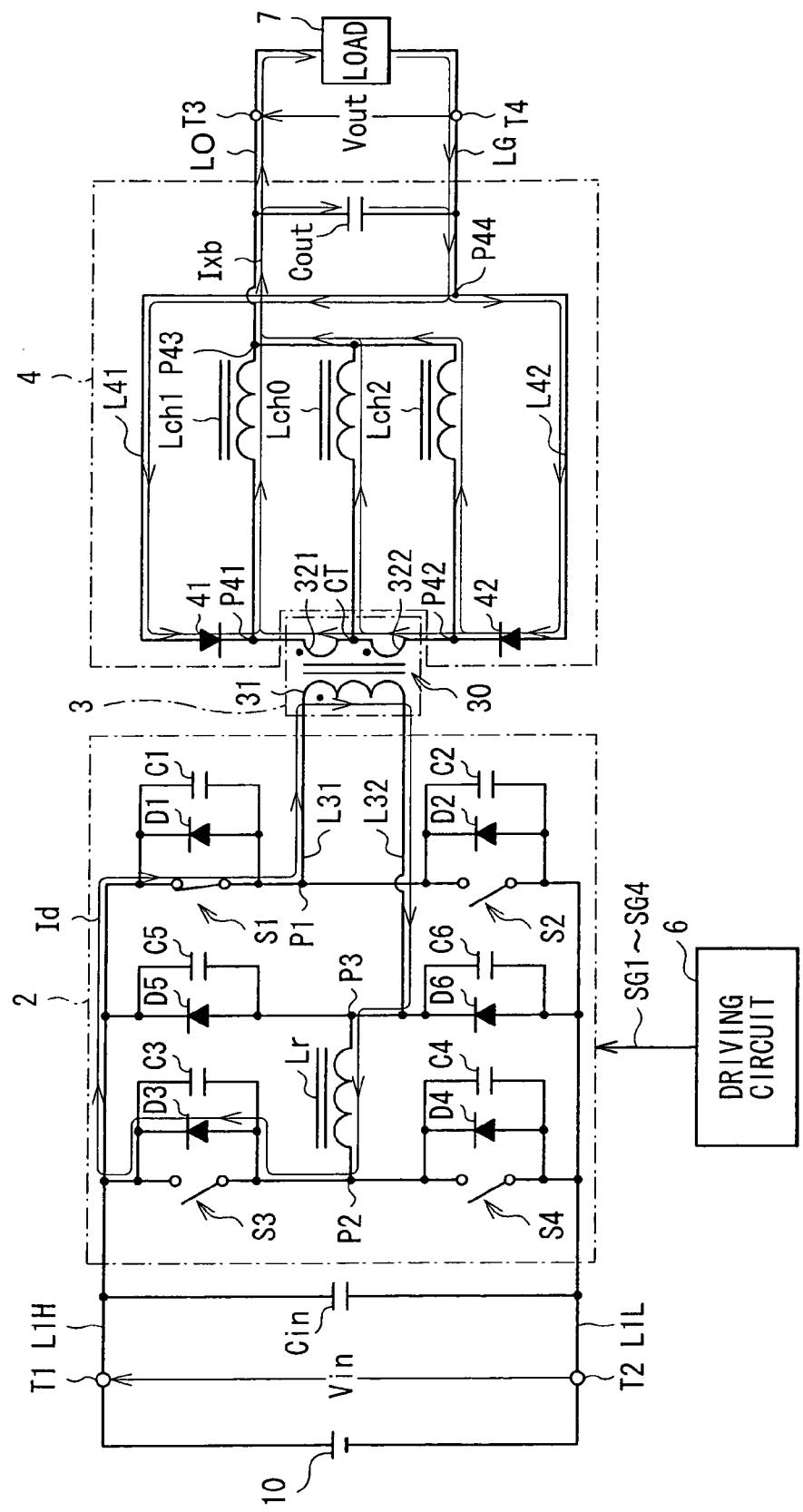
FIG. 5 is a circuit diagram for explaining the operations of the switching power supply unit subsequent to FIG. 4.
Figure 6:
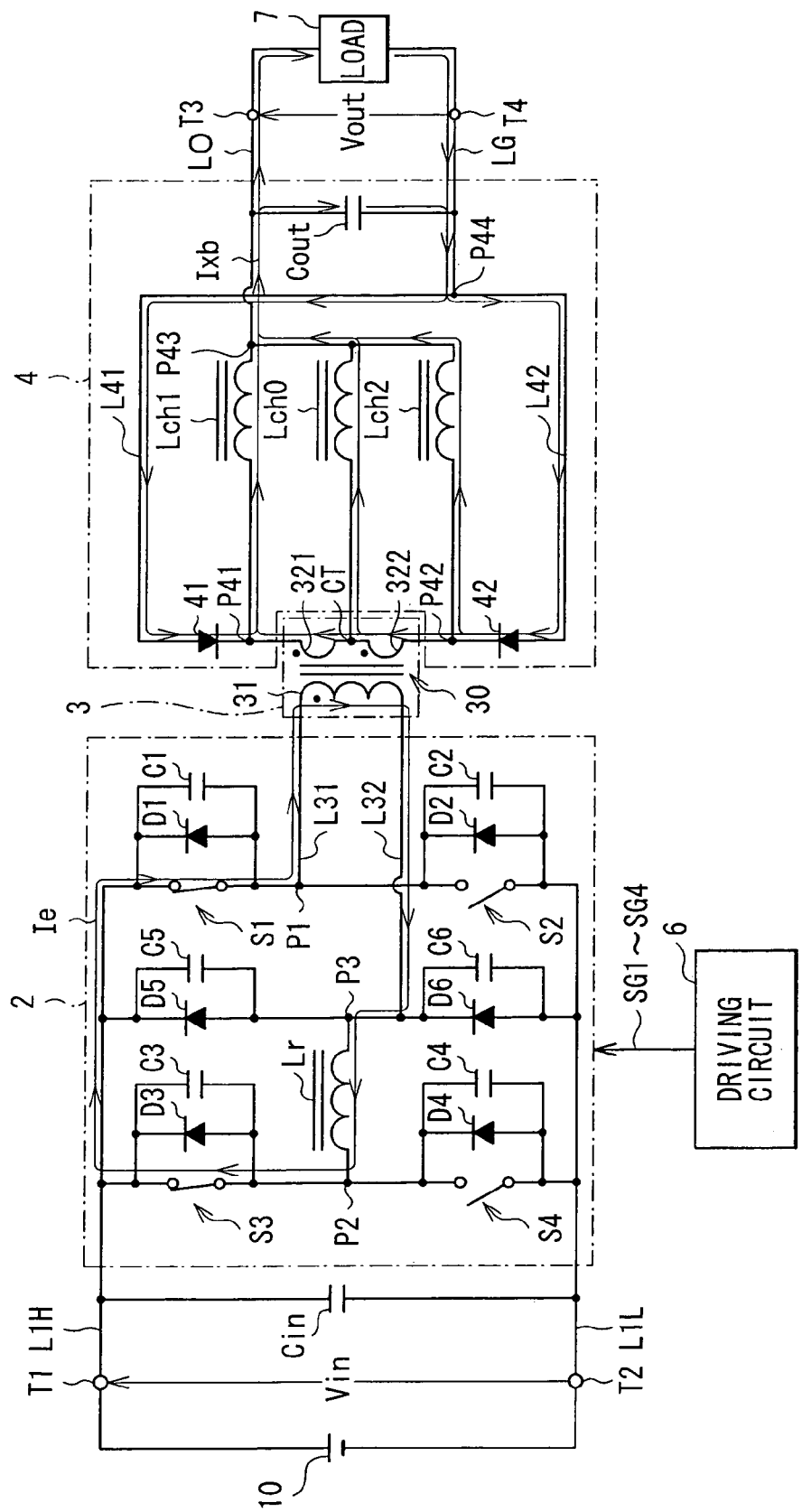
FIG. 6 is a circuit diagram for explaining the operation of the switching power supply unit subsequent to FIG. 5.

Next, in the period of the timing t2 to t3 as shown in FIG. 5, VP2, which is a potential of the connection point P2, gets equal to Vin at the timing of t2, and the diode D3 comes to be conductive. Subsequently, after the value of VP2 gets equal to that of Vin and the diode D3 gets conductive, the switching element S3 is turned off at the timing of t3 (see FIG. 2C) as shown in the period from the timing t3 to t4 of FIG. 6. In this manner, a zero volt switching (ZVS) is operated, and occurrence of short-circuit loss in the switching element S3 is suppressed. Meanwhile, in the secondary side of the transformer 3, a loop current Ixb similar to that of the period of the timing t1 to t2 flows in the period from timing t2 to timing t4, and the load 7 is driven.

Figure 7:
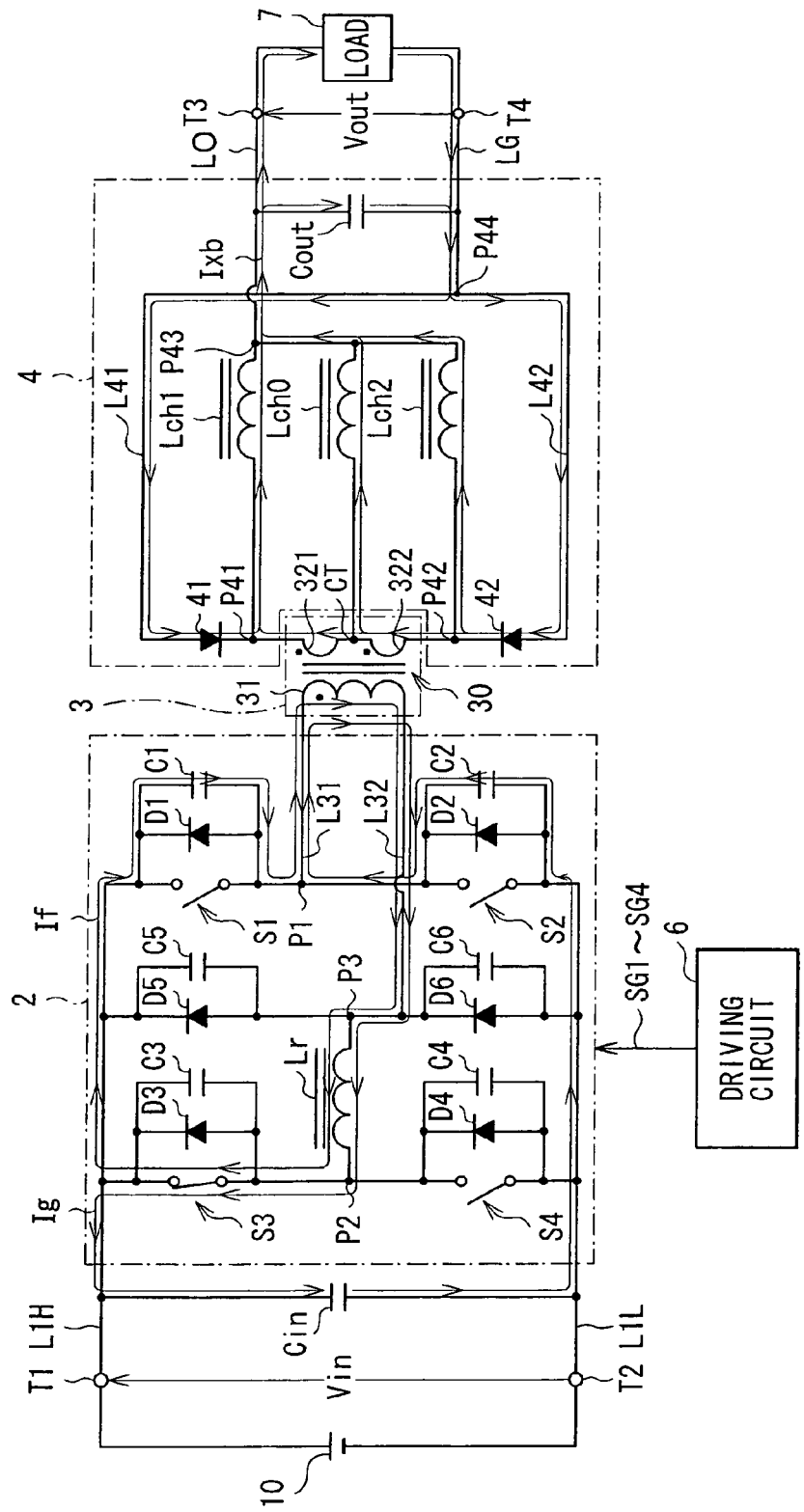
FIG. 7 is a circuit diagram for explaining the operation of the switching power supply unit subsequent to FIG. 6.

Next, in the period of the timing t4 to t5 as shown in FIG. 7, the switching element S1 is turned off at the timing of t4 (see FIG. 2A). Then, the capacitors C1 and C2 and the resonance inductor Lr collaborate to construct an LC resonance circuit and an LC resonance operation is carried out. Accordingly, while the loop currents If and Ig as shown in FIG. 7 flow and the capacitor C2 is discharged, the capacitor C1 is charged. Meanwhile, a loop current Ixb still flows to the secondary side of the transformer 3 and the load 7 is driven.

Figure 8:
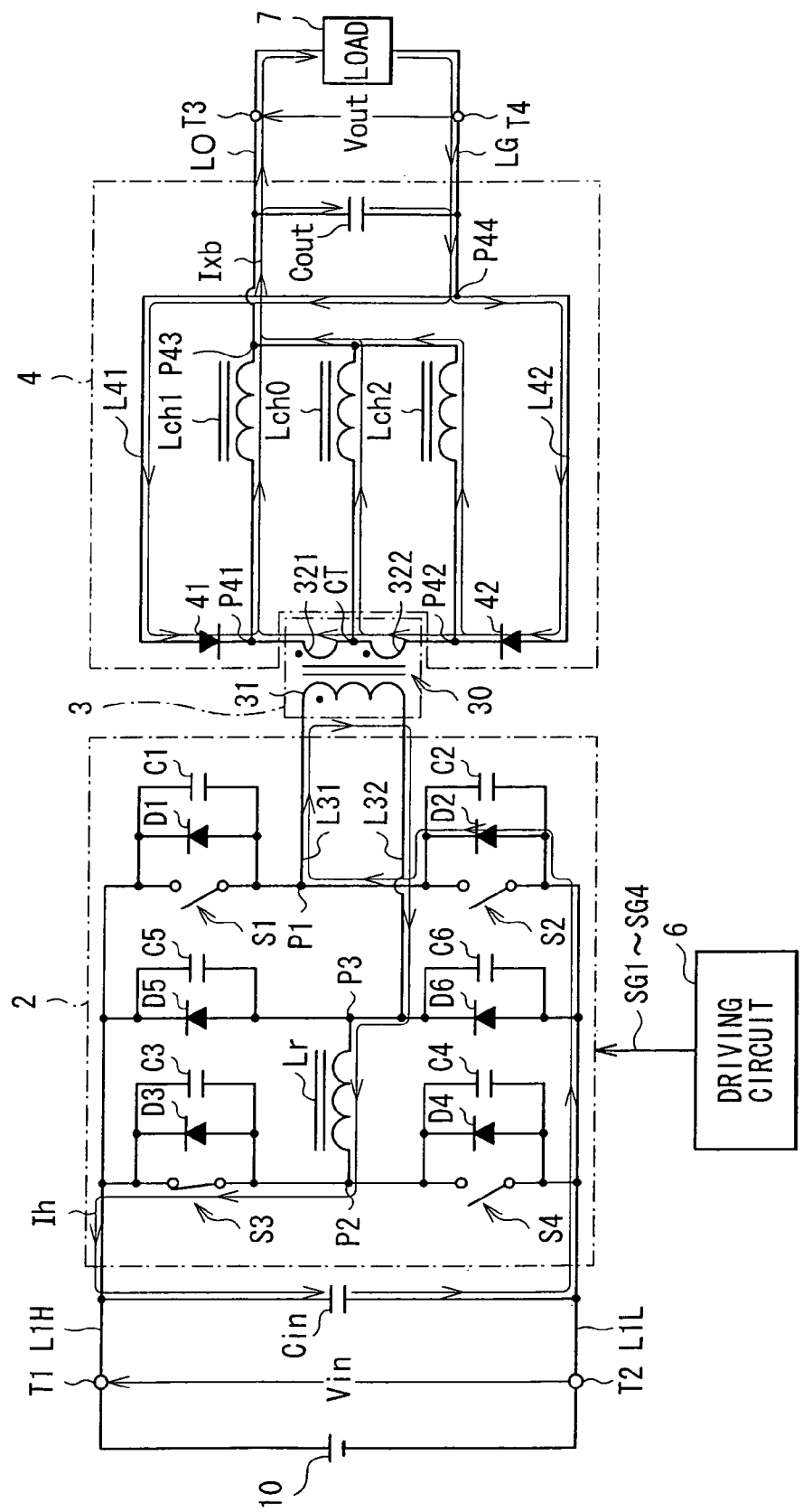
FIG. 8 is a circuit diagram for explaining the operation of the switching power supply unit subsequent to FIG. 7.
Figure 9:
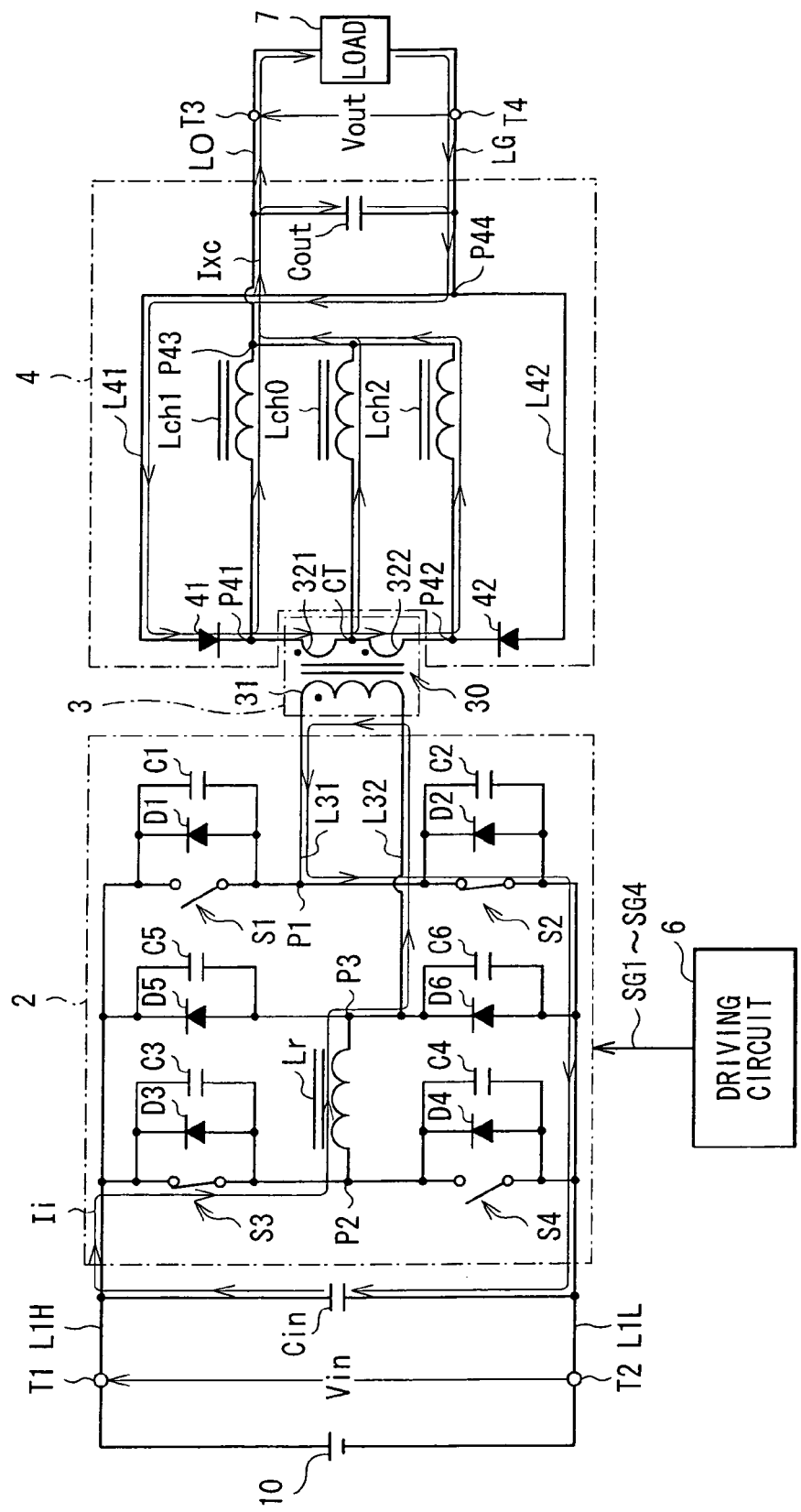
FIG. 9 is a circuit diagram for explaining the operation of the switching power supply unit subsequent to FIG. 8.

Next, in the period of the timing t5 to t6 as shown in FIG. 8, a potential value VP1 of the connection point P1 gets equal to zero volt in the timing t5, the diode D2 comes to be conductive. Then, the switching element S2 is turned on at the timing of t6 as shown in FIG. 9 after the VP1 gets equal to zero volt and the diode D2 gets conductive (see FIG. 2B). As a result, a zero volt switching (ZVS) is operated, and occurrence of short-circuit loss in the switching element S2 is suppressed. Meanwhile, a loop current Ixc flows to the secondary side of the transformer 3 via the rectifier diode 41, the three choke coils Lch0 to Lch2 and the output smoothing capacitor Cout at the timing of t6, and the load 7 is driven. Meanwhile, since the switching elements S2 and S3 are ON in the primary side of the transformer 3, a loop current Ii as shown in FIG. 9 begins to flow. Thereby, the resonance inductor Lr begins to be excited. Thus, operation of the first half cycle is completed.

(2-2. Operation of the Latter Half Cycle)

Next, operation in the latter half cycle (from timing t0'(t6) to t6'(t0)) subsequent to the timing t0 to t6 as shown in FIGS. 2A to 2I will be explained.

The operation in the latter half cycle is basically similar to that in the first half cycle described with reference to FIGS. 2A to 9. Namely, first, in the period from the timing t0' to t1', the switching elements S2 and S3 are turned on (FIGS. 2B and 2C) while the switching elements S1 and S4 are turned off (FIGS. 2A and 2D). Therefore, a loop current flows in the inverter circuit 2 so that the inductor Lre is excited and power is transmitted from the primary side to the secondary side of the transformer 3. Thereby, a loop current Ixc flows into the secondary side of the transformer 3, and the load 7 is driven (FIGS. 2E, 2F and 2I).

Subsequently, in the period from the t1' to t2', the switching element S3 is turned off at the timing of t1' (FIG. 2C). Then, the capacitors C3 and C4 and the resonance inductor Lr collaborate to construct an LC resonance circuit to implement an LC resonance operation. Therefore, a loop current flows and the capacitors C4 and C6 are discharged, while the capacitors C3 and C5 are charged. Meanwhile, the loop current Ixb flows into the secondary side of the transformer 3, and the load 7 is driven (FIGS. 2E, 2F and 2I).

Subsequently, in the period from the timing t2' to t3', a potential VP2 in the connection point P2 gets equal to zero volt at the timing of t2', and the diode D4 comes to be conductive. In the period of the timing t3' to t4', the switching element S4 is turned on at the timing of t3' as shown in FIG. 2D after the VP2 gets equal to zero volt and the diode D4 gets conductive. As a result, a zero volt switching (ZVS) is operated, and occurrence of short-circuit loss in the switching element S4 is suppressed. Meanwhile, in the period from timing t2' to t4', the loop current Ixb same as that of the period of the timing from t1' to t2' flows into the secondary side of the transformer 3, and the load 7 is driven.

Subsequently, in the period from the timing t4' to t5', the switching element S2 is turned off at the timing of t4' (FIG. 2B). Then, the capacitors C1 and C2 and the resonance inductor Lr collaborate to construct an LC resonance circuit and an LC resonance operation is carried out. Therefore, a loop current flows and the capacitors C1 is discharged while the capacitor C2 is charged. Meanwhile, the loop current Ixb still flows into the secondary side of the transformer 3, and the load 7 is driven.

Subsequently, in the period from the timing t5' to t6', a potential VP1 at the connection point P1 gets equal to Vin at the timing of t5', the diode D1 comes to be conductive. In addition, the switching element S1 is turned on at the timing of t6' as shown in FIG. 2A after the VP1 gets equal to Vin and the diode D1 gets conductive. In this manner, a zero volt switching (ZVS) is operated, and occurrence of short-circuit loss in the switching element S1 is suppressed. Meanwhile, in the secondary side of the transformer 3, the loop current Ixa flows at the timing of t6 and the load 7 is driven (FIGS. 2E, 2F and 2I). Thus, operation of the latter half cycle is completed, and returns to a state of the timing of t0 in FIGS. 2A to 2I.

(2-3. Comparison of Functions Between the Present Embodiment and Comparative Examples)

Subsequently, a function of the switching power supply unit of the present embodiment will be compared in detail with a function of the switching power supply unit of related art (shown by Comparative examples 1 and 2), with reference to FIGS. 10 and 11 together with FIG. 1.

(Function of Comparative Examples)

Figure 10:
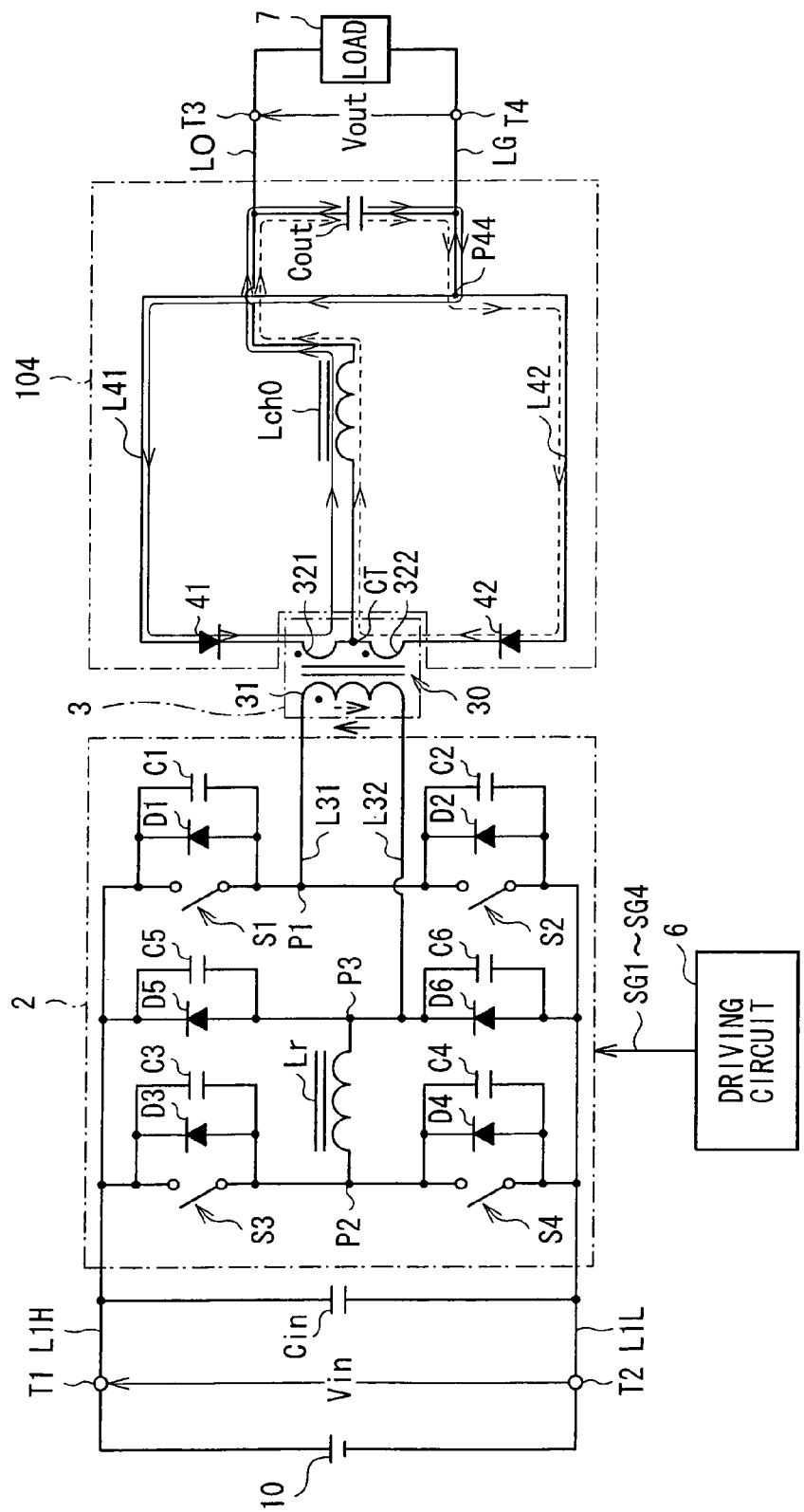
FIG. 10 is a circuit diagram showing a configuration of a switching power supply unit according to Comparative Example 1.
Figure 11:
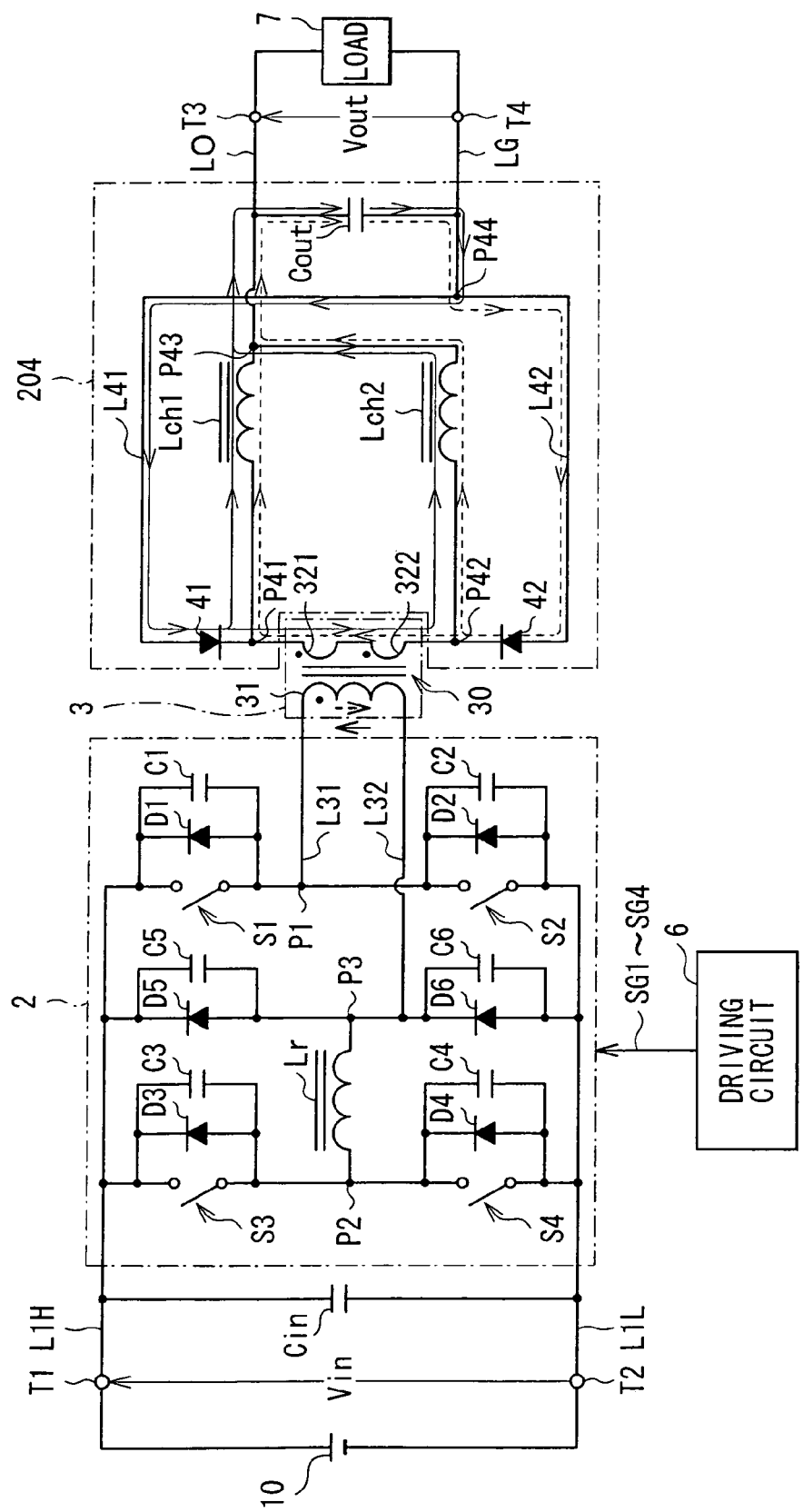
FIG. 11 is a circuit diagram showing a configuration of a switching power supply unit according to Comparative Example 2.

FIGS. 10 and 11 illustrate a circuit configuration of a switching power supply unit according to Comparative examples 1 and 2 respectively. Specifically, Comparative example 1 corresponds to a case where a rectification smoothing circuit 104 of center-tap type is substituted for the rectification smoothing circuit 4 of the present embodiment. Moreover, Comparative example 2 corresponds to a case where a rectification smoothing circuit 204 of current doubler type is substituted for the rectification smoothing circuit 4 of the present embodiment.

First, in the comparative example 1 of FIG. 10, since the rectification smoothing circuit 104 of a center tap type is employed, output currents are all flown into one choke coil Lch0 provided in the rectification smoothing circuit 104, like the loop current shown in the figure. Accordingly, the operating point of the choke coil Lch0 gets so high that it easily exceeds the limiting value of AL-Value and NI-Limit (DC superposing characteristic of the choke coil Lch0 deteriorates and inductance is liable to be saturated). Such high operating point of the choke coil Lch0 may cause enlargement in size of the choke coil Lch0, inevitably lowered inductance thereof or an increase of power loss ($=R*I^2$) thereof.

Meanwhile, in the comparative example 2 of FIG. 11, since the rectification smoothing circuit 204 of current doubler type is used, the output current is split into two choke coils Lch1 and Lch2 like a loop current shown in the figure. Accordingly, compared with the above-mentioned comparative example 1 (as for the center tap type), the operating point of each choke coil Lch1 and Lch2 may be somewhat lowered. However, in order to increase the amount of the current (output current) dealt-with in the switching power supply unit, it is further necessary to still lower the operating point of the choke coil. Thus the rectification smoothing circuit 204 of this current doubler type is insufficient in view thereof.

(Function of the Present Embodiment)

On the other hand, according to the present embodiment, the rectification smoothing circuit 4 is configured such that the rectifier diode 41 is arranged between the connection point P41, which is a connection point between one end of the secondary winding 321 and one end of the choke coil Lch1, and one end (connection point P44) of the output smoothing capacitor Cout while the rectifier diode 42 is arranged between the connection point P42, which is a connection point between the secondary winding 322 and the choke coil Lch2, and the end (connection point P44) of the output smoothing capacitor Cout, as shown in FIG. 1. Moreover, while the other ends (center tap CT) of the secondary windings 321 and 322 are connected to one end of the choke coil Lch0, the other ends (connection point P43) of the three choke coils Lch0 to Lch2 are connected to the other end (connection point P43) of the output smoothing capacitor Cout. In this manner, in the rectification smoothing circuit 4, the output current Iout (choke current Ich=Ich0+Ich1+Ich2) is split into the three choke coils Lch0 to Lch2 as shown in the loop currents Ixa to Ixc of FIGS. 3 to 9, and the amount of current dealt-with in each choke coil is reduced.

When inductance of the choke coils Lch0, Lch1 and Lch2 is defined as L0, L1 and L2 respectively, it is preferable that a conditional expression "L0<L1≈L2" be satisfied. Inductance values of L1 and L2 do not need to be equal, but it is preferable that the difference thereof fall within the range of about twenty percent. With such configuration, the limiting values of AL-Value and NI-Limit get closer each other in each choke coil of Lch0, Lch1, and Lch2. Namely, since the peak values of the electric currents flowing into the respective choke coils Lch0, Lch1 and Lch2 get closer to one another, output current Iout (choke current Ich) may be more easily split into the three choke coils Lch0 to Lch2.

As mentioned above, in the rectification smoothing circuit 4 according to the present embodiment, the rectifier diode 41 is arranged between one ends (connection point P41) of the secondary winding 321 and the choke coil Lch1, and one end (connection point P44) of the output smoothing capacitor Cout, the rectifier diode 42 is arranged between one ends (connection point P42) of the secondary windings 322 and the choke coil Lch2, and the end (connection point P44) of output smoothing capacitor Cout. The other ends (center tap CT) of the secondary windings 321 and 322 are mutually connected to one end of the choke coil Lch0, and the other ends (connection point P43) of the three choke coils Lch0 to Lch2 are connected to the other end (connection point P43) of the output smoothing capacitor Cout. In this manner, the amount of current dealt-with in each choke coil is reduced and DC superposing characteristic of the choke coils Lch0 to Lch2 may be reduced (inductance is less likely to be saturated). Therefore, the operating point of the output power smoothing choke coil may be more lowered than ever. Thereby, a smaller choke coil with high inductance is available, while the power loss in the choke coil may be reduced.

In addition, since the choke coil Lch0 connected to the center tap CT is used in common (shared), the inductance dispersion between the two choke coils Lch1 and Lch2 sandwiching Lch0 (gap) may be absorbed and the output power smoothing characteristic of the choke coil may be improved.

Furthermore, when the values of inductance L0, L1 and L2 of the choke coils Lch0, Lch1 and Lch2 satisfy the conditional expression "L0<L1≈L2", an output current Tout (choke current Ich) may be split into the three choke coils Lch0 to Lch2 more easily.

Subsequently, examples of modification according to the present invention will be explained hereinbelow. Here, the same reference numerals as in the above embodiment have been used to indicate substantially identical components, and descriptions will be appropriately omitted.

[First Modification]

(Whole Configuration Example of Switching Power Supply Unit)

Figure 12:
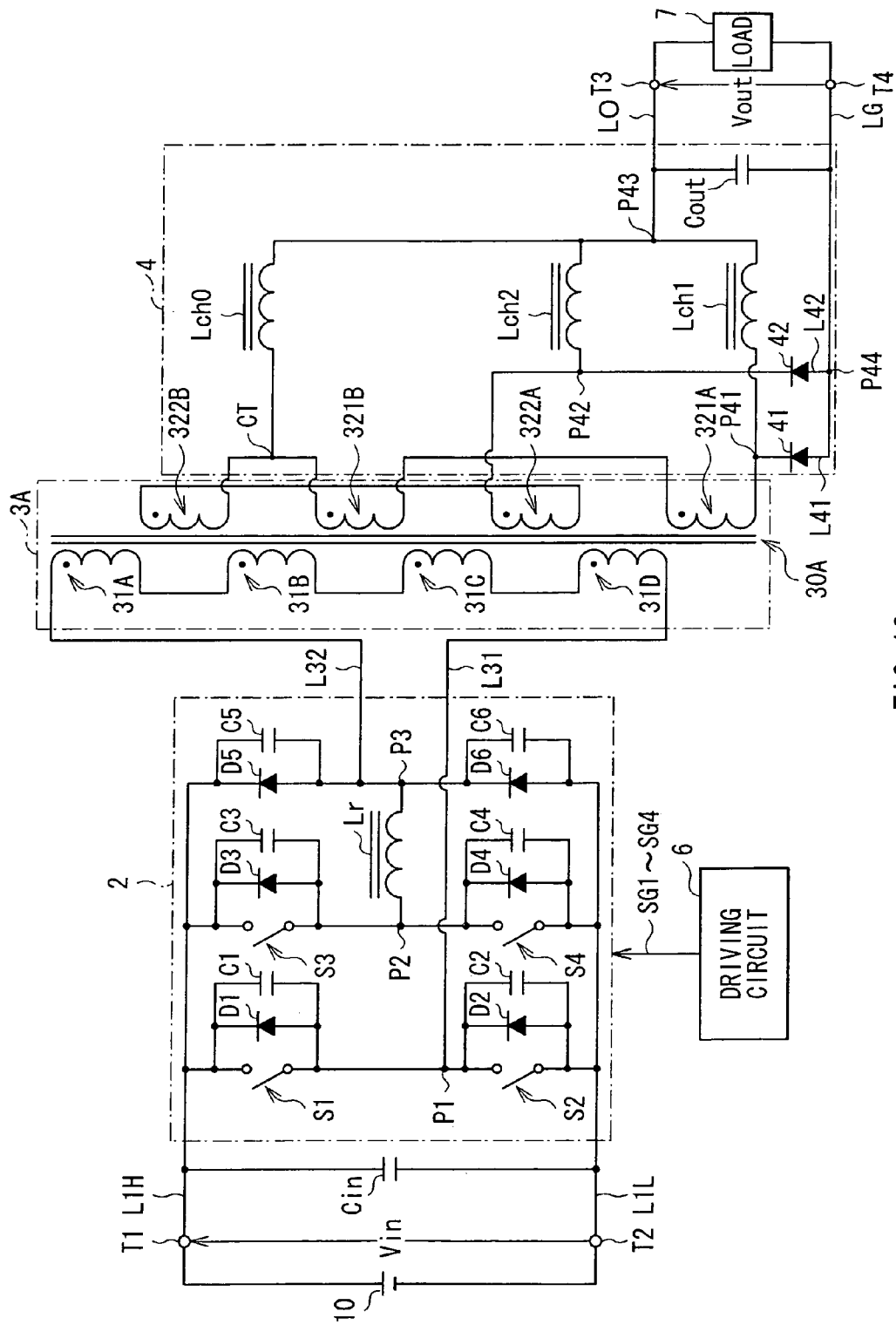
FIG. 12 is a circuit diagram showing a configuration (configuration of an equivalent circuit) of a switching power supply unit according to Modification 1 of the present invention.

FIG. 12 illustrates a configuration of a switching power supply unit (configuration of equivalent circuit) according to Modification 1 of the present invention. In the switching power supply unit of the present modification, a transformer 3A to be described hereinbelow is substituted for the transformer 3 provided in the switching power supply unit of the above-mentioned embodiment.

The transformer 3A includes a magnetic core 30A constituted from an upper core UC and a lower core DC to be described later, which are facing each other, four primary windings 31A to 31D and four secondary windings 321A, 321B, 322A and 322B. It is to be noted that a combination of two secondary windings 321A and 321B correspond to the secondary winding 321 of the above-mentioned embodiment, and a combination of two secondary windings 322A and 322B correspond to the secondary winding 322 of the above-mentioned embodiment.

The primary windings 31A to 31D are connected in series one another. Specifically, one end of the primary winding 31A is connected to a connection point P3 via the connection line L32 and the other end thereof is connected to one end of the primary winding 31B. The other end of the primary winding 31B is connected to one end of the primary winding 31C, and the other end of the primary winding 31C is connected to one end of the primary winding 31D. The other end of the primary winding 31D is connected to a connection point P1 via a connection line L31.

The secondary windings 321A and 321B are connected in series to each other while the secondary windings 322A and 322B are connected in series to each other. Specifically, one end of the secondary winding 321A is connected to a connection point P41 and the other end thereof is connected to one end of the secondary winding 321B. The other end of this secondary winding 321B is connected to a center tap CT. In the secondary winding 322A, one end thereof is connected to the connection point P42 and the other end thereof is connected to one end of the secondary winding 322B. The other end of the secondary winding 322B is connected to the center tap CT.

(Detailed Configuration of Transformer 3A)

Subsequently, detailed configuration of the transformer 3A according to the present modification will be described hereinbelow with reference to FIGS. 13, 14A and 14B. Here, FIG. 13 is an exploded perspective view showing an external appearance configuration of a principal part of the transformer 3A, and FIGS. 14A and 14B schematically show an example of reflux of flux paths formed in this transformer 3A.

Figure 13:
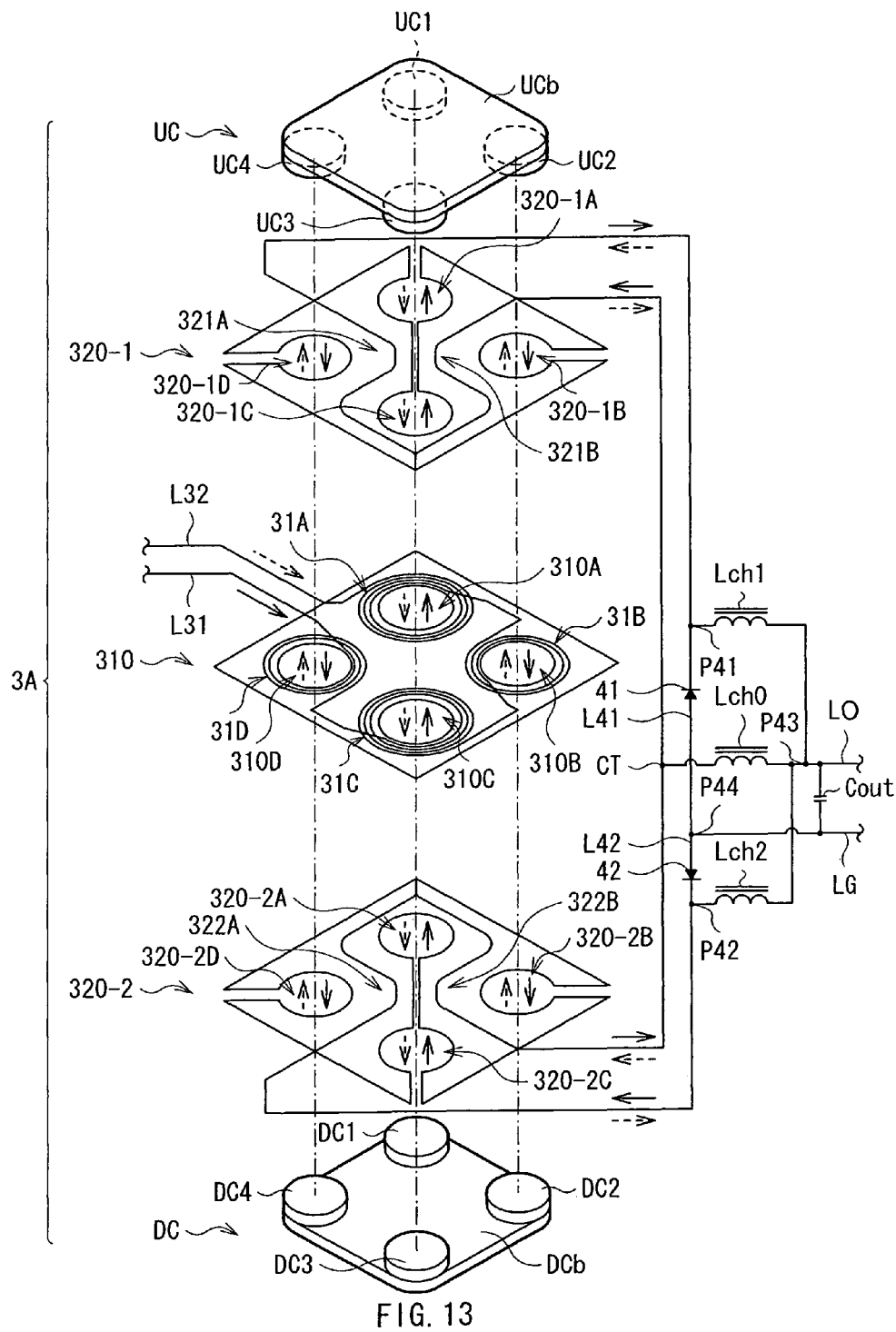
FIG. 13 is an exploded perspective view showing an external appearance configuration of a principal part of a transformer illustrated in FIG. 12.
Figure 14A:
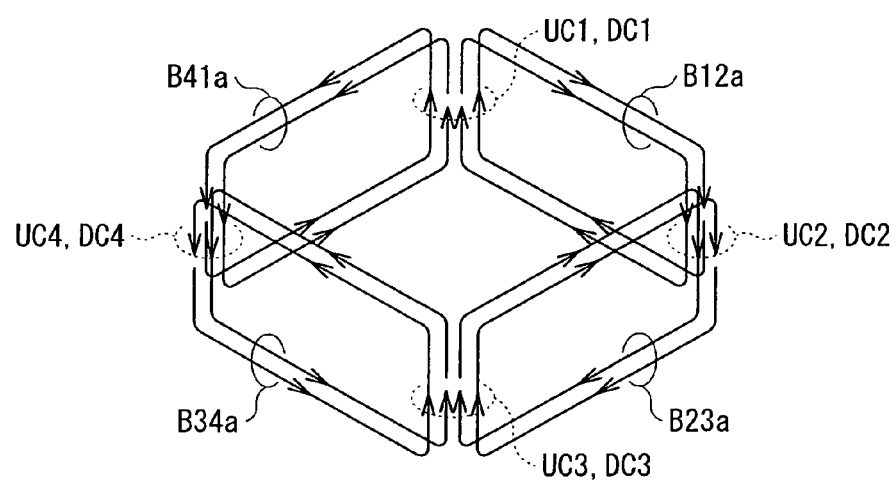
FIGS. 14A and 14B are pattern diagrams showing an example of reflux of flux paths that are formed in the transformer of FIG. 12.
Figure 14B:
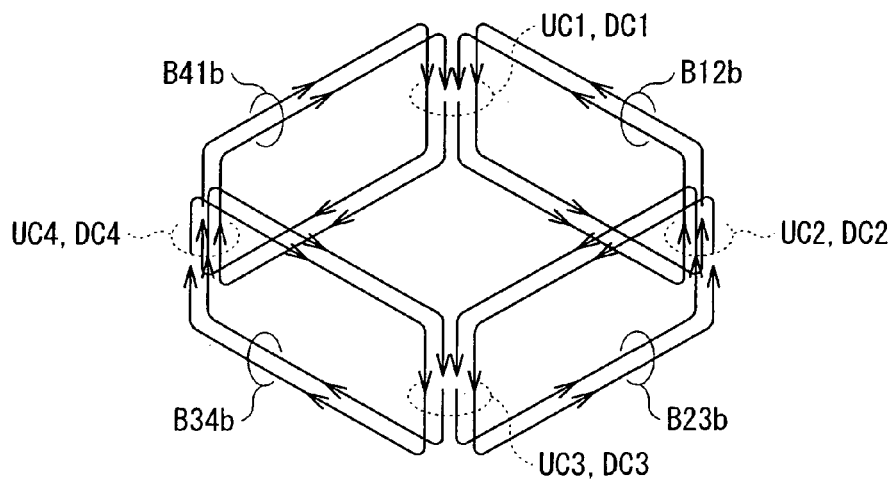

As shown in FIG. 13, in the transformer 3A, with respect to the core material (magnetic core 30A) constituted from an upper core UC and a lower core DC that are facing each other, a printed coil 310 that constitutes primary windings 31A to 31D, a metal plate 320-1 that constitutes the secondary windings 321A and 321B, and a metal plate 320-2 that constitutes the secondary windings 322A and 322B are wound around, in a plane (in a horizontal plane) perpendicular to the extending direction (vertical direction) of four leg portions to be described hereinbelow. The upper core UC is constituted from a base core UCb and four leg portions extended from the base core UCb in the above-mentioned perpendicular direction (penetrating direction), that is, a first leg portion UC1, a second leg portion UC2, a third leg portion UC3 and a fourth leg portion UC4. The lower core DC is constituted from a base core DCb and four leg portions extended from the base core DCb in the above-mentioned perpendicular direction (penetrating direction), that is, a first leg portion DC1, a second portion DC2, a third leg portion DC3 and a fourth leg portion DC4. The first leg portions UC1 and DC1, the second leg portions UC2 and DC2, the third leg portions UC3 and DC3 and the fourth leg portions UC4 and DC4 are separately disposed in pairs along two cross lines (two diagonal lines) on the mutually-facing surfaces of the base cores UCb and DCb. These four leg portions UC1 to UC4 and DC1 to DC4 magnetically connect the mutually-facing two base cores UCb and DCb. Specifically, here, the first leg portions UC1 and DC1, the second leg portions UC2 and DC2, the third leg portions UC3 and DC3 and the fourth leg portions UC4 and DC4 are each disposed to constitute the four corners of the square plane of the base cores UCb and DCb. Namely, the four leg portions are disposed at the four corners of the base cores UCb and DCb of a rectangular shape (square shape). The first leg portions UC1 and DC1 and the third leg portions UC3 and DC3 are disposed at both ends of one diagonal line to form a leg portion pair (first leg portion pair), while the second leg portions UC2 and DC2 and the fourth leg portions UC4 and DC4 are disposed at both ends of the other diagonal line to form a leg portion pair (second leg portion pair). The upper core UC and the lower core DC are each made of a magnetic material such as ferrite, for example, and the printed coil 310 and the metal plates 320-1 and 320-2 to be described hereinbelow are made of a conductive material such as copper and aluminum, for example.

The printed coil 310 has four through-holes 310A to 310D through which the leg portions UC1 to UC4 and DC1 to DC4 are passing respectively. The first leg portion UC1 and DC1 are passing through the through-hole 310A, the second leg portions UC2 and DC2 are passing through the through-hole 310B, the third leg portions UC3 and DC3 are passing through the through-hole 310C, and the fourth leg portions UC4 and DC4 are passing through the through-hole 310D. Moreover, in the printed coil 310, from the connection line L32 toward the connection line L31, the primary winding 31A which is wound around the first leg portions UC1 and DC1, the primary winding 31B that is wound around the second leg portions UC2 and DC2, the primary winding 31C which is wound around the third leg portions UC3 and DC3, and the primary winding 31D which is wound around the fourth leg portions UC4 and DC4, are connected one another.

The metal plate 320-1 that constitutes the secondary windings 321A and 321B are disposed between the printed coil 310 and the upper core UC. Four through-holes 320-1A to 320-1D through which the leg portions UC1 to UC4 and DC1 to DC4 are passing one to one are formed in the metal plate 320-1. The first leg portions UC1 and DC1 are passing through the through-hole 320-1A, the second leg portions UC2 and DC2 are passing through the through-hole 320-1B, the third leg portions UC3 and DC3 are passing through the through-hole 320-1C, and the fourth leg portions UC4 and DC4 are passing through the through-hole 320-1D. Specifically, in the metal plate 320-1, from the connection point P41 through the center tap CT, the secondary winding 321A that is wound around the fourth leg portions UC4 and DC4 and the secondary winding 321B that is wound around the second leg portions UC2 and DC2 are connected to each other in series.

The metal plate 320-2 which constitutes the secondary windings 322A and 322B are arranged between the printed coil 310 and the lower core DC. Four through-holes 320-2A to 320-2D through which the leg portions UC1 to UC4 and DC1 to DC4 are passing one to one are formed in the metal plate 320-2. The first leg portions UC1 and DC1 are passing through the through-hole 320-2A, the second leg portions UC2 and DC2 are passing through the through-hole 320-2B, the third leg portions UC3 and DC3 are passing through the through-hole 320-2C, and the fourth leg portions UC4 and DC4 are passing through the through-hole 320-2D. In the metal plate 320-2, from the connection point P42 through the center tap CT, the secondary winding 322A which is wound around the fourth leg portions UC4 and DC4 and the secondary winding 322B which is wound around the second leg portions UC2 and DC2 are connected in series.

Here, the primary windings 31A to 31D, the secondary windings 321A and 321B, 322A and 322B are each configured to be pulled out from outside via wirings (connection lines L31 and L32, connection lines L41 and L42, the output line LO, and the ground line LG) in an in-plane direction of the printed coil 310 and the metal plates 320-1 and 320-2.

In such configuration, in the transformer 3A, due to currents passing through the primary windings 31A to 31D and the secondary windings 321A and 321B and 322A and 322B, a flux path (reflux of flux path) is formed in the inside of the four leg portions UC1 to UC4 and DC1 to DC4 and the two base cores UCb and DCb, as shown by arrows indicated in FIGS. 13, 14A and 14B, for example. Thus, a magnetic flux is formed in the four leg portions UC1 to UC4 and DC1 to DC4 in the penetrating direction thereof. As for the arrows illustrated in the through-holes 310A to 310D of FIG. 13 representing directions of magnetic flux, the solid line arrows correspond to the magnetic flux formed at the time that currents flow from the connection line L31 in the direction of solid line arrow, while the broken line arrows correspond to the magnetic flux formed at the time that currents flow from the connection line L32 in the direction of broken line arrow. In addition, FIG. 14A shows a reflux of the flux path formed at the time that the currents flow from the connection line L31 in the direction of solid line arrows, and FIG. 14B shows the reflux of the flux path formed at the time that the currents flow from the connection line L32 in the direction of broken line arrows. Here, the directions of the magnetic fluxes are the same in the first leg portion pair constituted from the first leg portions UC1 and DC1 and the third leg portions UC3 and DC3, while the direction of the magnetic fluxes are the same in the second leg portion pair constituted from the second leg portions UC2 and DC2 and the fourth leg portions UC4 and DC4. In addition, it is to be noted that the directions of the magnetic fluxes are opposite to each other between the first leg portion pair and the second leg portion pair. In other words, the magnetic fluxes generated inside the first leg portions UC1 and DC1 and the third leg portions UC3 and DC3 are both directed in a first direction, while the magnetic flux produced inside the second leg portions UC2 and DC2 and the fourth leg portions UC4 and DC4 are both directed in a second direction opposite to the first direction. Further, as shown in FIGS. 14A and 14B for example, there are four annular magnetic paths formed such as annular magnetic paths B12*a* and B12*b* passing through the inside of the first leg portions UC1 and DC1 and the second leg portions UC2 and DC2, the annular magnetic paths B23a and B23b passing through the inside of the second leg portions UC2 and DC2 and the third leg portions UC3 and DC3, annular magnetic paths B34a and B34b passing through the inside of the third leg portions UC3 and DC3 and the fourth leg portions UC4 and DC4, and annular magnetic paths B41a and B41b passing through the inside of fourth leg portions UC4 and DC4 and the first leg portions UC1 and DC1. Namely, the annular magnetic paths B12a and B12b and the annular magnetic paths B41a and B41b share the first leg portions UC1 and DC1, the annular magnetic paths B12a B12b and the annular magnetic paths B23a and B23b share the second leg portions UC2 and DC2, the annular magnetic paths B23a and B23b and the annular magnetic paths B34a and B34b share the third leg portions UC3 and DC3, and the annular magnetic path B34a and B34b and the annular magnetic paths B41a and B41b share the fourth leg portions UC4 and DC4. In other words, four flux paths, each passing in one direction through adjacent two of the four leg portions UC1 to UC4 and DC1 to DC4 and through the two base cores UCb and DCb, are formed in the four leg portions UC1 to UC4 and DC1 to DC4 and the two base cores UCb and DCb. Though details will be described hereinafter, formation areas of these four annular magnetic paths go around the four leg portions in the base cores UCb and DCb.

Here, the first modification corresponds to the second embodiment of the first switching power supply unit of the present invention, and the core material (magnetic core 30A) constituted from the upper core UC and lower core DC correspond to a specific example of the "magnetic core" of the invention. The printed coil 310 corresponds to a specific example of the "first conductive member" of the invention, and the metal plate 320-1 which constitute the secondary windings 321A and 321B as the first secondary winding corresponds to a specific example of the "second conductive member" of the second embodiment of the first switching power supply unit of the invention, and the metal plate 320-2 which constitute the secondary windings 322A and 322B as the second secondary winding corresponds to a specific example of the "third conductive member" of the second embodiment of the first switching power supply unit of the invention. The base cores UCb and DCb correspond to a specific example of "two base portions" of the invention, and first leg portion (UC1+DC1), the second leg portion (UC2+DC2), the third leg portion (UC3+DC3) and the fourth leg portion (UC4+DC4) correspond to a specific example of "four leg portions" of the invention.

Subsequently, functions and effects of the switching power supply unit according to the modification will be explained. Since entire operation of the switching power supply unit is the same as that of the above-mentioned embodiment, a description thereof is omitted and is concentrated mainly on the functions and effects of the transformer 3A.
(Function of Transformer 3A)

As Shown in FIGS. 13, 14a and 14b, in the Transformer 3A of the present modification, directions of the magnetic flux formed in the four leg portions UC1 to UC4 and DC1 to DC4 are determined so as to be directed in a same direction in the first leg portion pair, which is constituted from the first leg portions UC1 and DC1 and the third leg portions UC3 and DC3, and directions of the magnetic flux are the same in the second leg portion pair, which is constituted from the second leg portions UC2 and DC2 and the fourth leg portions UC4 and DC4. In addition, it is to be noted that the directions of the magnetic fluxes are opposite to each other between the first leg portion pair and the second leg portion pair. In other words, magnetic fluxes generated in the first leg portions UC1 and DC1 and the third leg portions UC3 and DC3 may both be directed in a first direction, and magnetic fluxes generated in the second leg portions UC2 and DC2 and the fourth leg portions UC4 and DC4 may both be directed in the second direction opposite to the above-mentioned first direction.

Figure 15A:
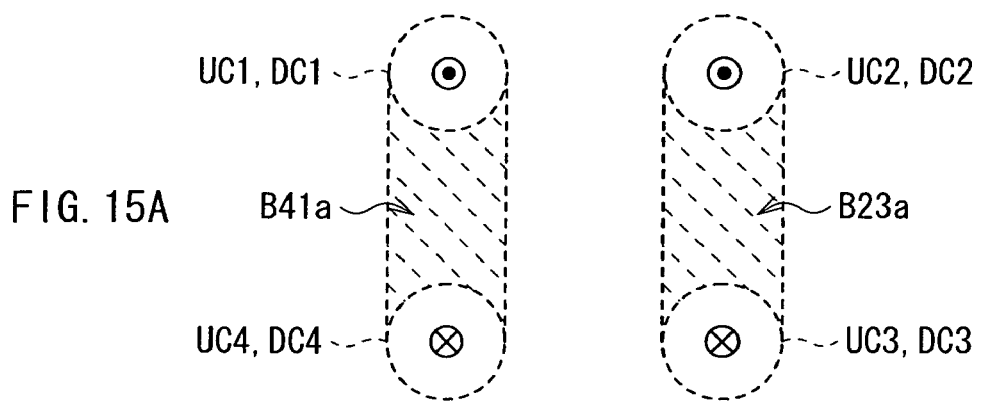
FIGS. 15A and 15B are planar schematic diagrams to explain the operation of the transformer illustrated in FIG. 12.
Figure 15B:
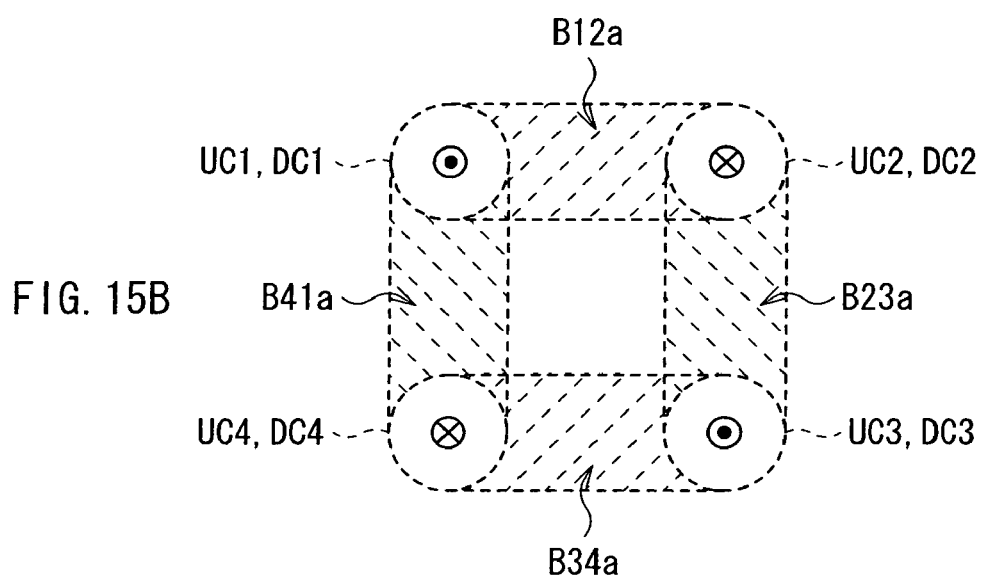

As shown in FIGS. 14A, 14B and 15B for example, when the primary windings 31A to 31D and the secondary windings 321A, 321B and 322A, 322B are wound around to make the magnetic flux directed in such a manner as described above, four annular magnetic paths are formed, which are constituted from the annular magnetic paths B12a and B12b passing through the inside of the first leg portions UC1 and DC1 and the second leg portions UC2 and DC2, the annular magnetic paths B23a and B23b passing through the inside of the second leg portions UC2 and DC2 and the third leg portions UC3 and DC3, annular magnetic paths B34a and B34b passing through the inside of the third leg portions UC3 and DC3 and the fourth leg portions UC4 and DC4, and annular magnetic paths B41a and B41b passing through the inside of fourth leg portions UC4 and DC4 and the first leg portions UC1 and DC1. The formation area of these four annular magnetic paths B12a, B12b, B23a, B23b, B34a, B34b, B41a and B41b goes around the four leg portions UC1 to UC4 and DC1 to DC4 on the base cores UCb and DCb. Namely, the annular magnetic paths B12a and B12b and the annular magnetic paths B41a and B41b share the first leg portions UC1 and DC1, the annular magnetic paths B12a B12b and the annular magnetic paths B23a and B23b share the second leg portions UC2 and DC2, the annular magnetic paths B23a and B23b and the annular magnetic paths B34a and B34b share the third leg portions UC3 and DC3, and the annular magnetic path B34a and B34b and the annular magnetic paths B41a and B41b share the fourth leg portions UC4 and DC4. In other words, four flux paths, each passing in one direction through adjacent two of the four leg portions UC1 to UC4 and DC1 to DC4 and through the two base cores UCb and DCb, are formed in the four leg portions UC1 to UC4 and DC1 to DC4 and the two base cores UCb and DCb.

Accordingly, compared with a case where only two annular magnetic paths are formed as shown in FIG. 15A for example, such as annular magnetic paths B41a and B41b passing through the inside of the first leg portions UC1 and DC1 and the fourth leg portions UC4 and DC4 and the annular magnetic paths B23a and B23b passing through the inside of the second leg portions UC2 and DC2 and the third leg portions UC3 and DC3, (that corresponds to a case where two U-shaped cores of related art are used), the magnetic flux in the magnetic core 30A is dispersed, and thus flux density may be reduced to decrease occurrence of core loss. In addition, since radiation path is expanded compared with the conventional case of an E-shaped core, cooling of the magnetic core 30A, the primary windings 31A to 31D and the secondary windings 321A, 321B and 322A and 322B becomes more easy.

As mentioned above, according to the present modification, since the primary windings 31A to 31D, the secondary windings 321A, 321B and 322A and 322B are wound around so that the magnetic fluxes formed in the penetrating direction in the four leg portions UC1 to DC4 and DC1 to DC4 may be directed in a same direction in the first leg portion pair constituted from the first leg portions UC1, DC1 and the third leg portions UC3, DC3 while directed in a same direction in the second leg portion pair constituted from the second leg portions UC2, DC2 and the fourth leg portions UC4, DC4 and that the magnetic fluxes of the first and second leg portion pairs are directed opposite to each other, the four annular magnetic paths B12a, B12b, B23a, B23b, B34a, B34b, B41a and B41 are formed as described above, and the formation area of the four annular magnetic paths goes around the four leg portions UC1 to UC4 and DC1 to DC4 on the base core UCb and DCb. In other words, according to the present embodiment, the primary windings 31A to 31D and the secondary windings 321A, 321B, 322A and 322B are wound around so that both of the magnetic fluxes generated inside the first leg portions UC1 DC1 and the third leg portions UC3 and DC3 may be directed in the first direction, while both of the magnetic fluxes generated inside the second leg portions UC2 and DC2 and the fourth leg portions UC4 and DC4 may be directed in the second direction opposite to the first direction. Thus four flux paths, each flowing in one direction through adjacent two of the four leg portions UC1 to UC4 and DC1 to DC4 and through the two base cores UCb and DCb, are formed inside the four leg portions UC4 to UC4 and DC1 to DC4 and the two base cores UCb and DCb. In this manner, the flux density in the magnetic core 30A is reduced to decrease occurrence of core loss compared with the case where the U-shaped core is employed. Thus, the core height may be lowered by reducing the core thickness (thickness of the base portion). In addition, since radiation path is expanded compared with the case of the E-shaped core, cooling of the magnetic core 30A, the primary windings 31A to 31D and the secondary windings 321A, 321B, 322A and 322B gets more easy. As a result, cost reduction is available while increasing reliability of product.

In addition, in such configuration, the switching power supply unit as a whole gets able to deal with a big current without parallel operation of a plurality of inverter circuits 2, transformers 3A and so on. In this manner, reduction of the number of components is available and that may also result in the cost reduction.

What is more, the primary windings 31A to 31D and the secondary windings 321A, 321B, 322A and 322B are configured to be pulled out from outside via wirings (the connection lines L31 and L32, the connection lines L41 and L42, the output line LO or the ground line LG) along the in-plane direction of the printed coils 310 and the two metal plates 320-1 and 320-2. Accordingly, the height of the core including wiring gets able to be reduced compared with a case where such wiring is pulled out in a direction vertical to the plane of the printed coil 310 and the two metal plates 320-1 and 320-2 while the pullout structure of the wiring becomes more simple.

Figure 16A:
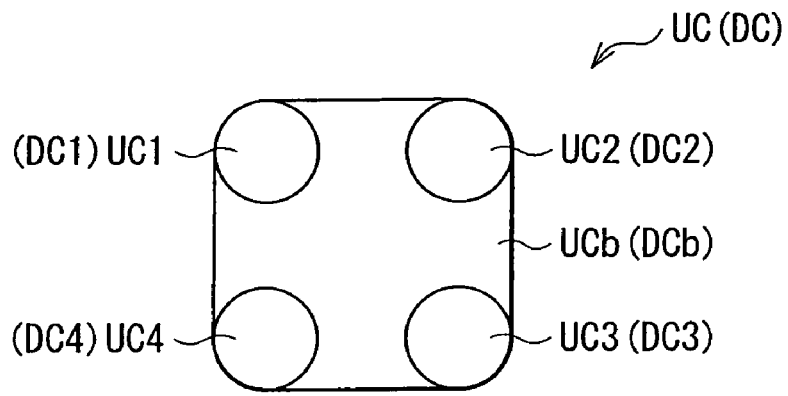
FIGS. 16A, 16B and 16C are plan views to show an external appearance configuration of other examples of an upper core and a lower core of the transformer of FIG. 12.
Figure 16B:
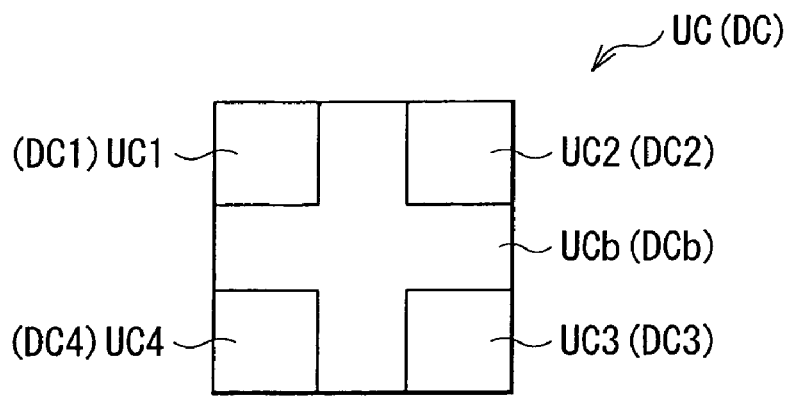
Figure 16C:
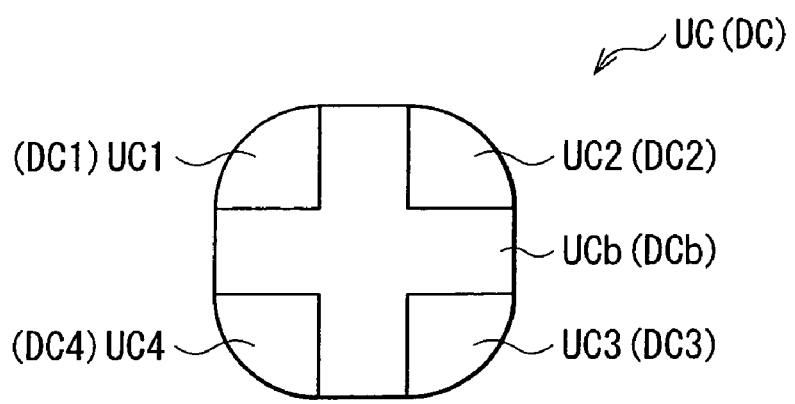

According to the present modification, description is made as to the case in which each side-face of the four leg portions UC1 (DC1) to UC4 (DC4) is a curved surface as shown in FIG. 16A of the upper core UC (lower core DC), but the side-face geometry of each leg portion is not limited thereto. Specifically, as shown in FIGS. 16B and 16C, for example, the four leg portions UC1 (DC1) to UC4 (DC4) may be configured such that at least mutually-opposed side-faces are parallelized each other. In such configuration, concentration of magnetic flux on the shortest magnetic flux path in the magnetic core 30A is more effectively modified to improve the reduction of core loss. Further in this case, the outer surface of the four leg portions UC1 (DC1) to UC4 (DC4), on a side opposite to the mutually-opposed side-faces, may be a curved surface as shown in FIG. 16C for example. In such configuration, the primary windings 31A to 31D and the secondary windings 321A, 321B, 322A and 322B may be wound around the respective leg portions more easily so that the current path is shortened and concentration of current distribution to an angular portion is relieved. By the way, the angular portions on the side-faces of the four leg portions UC1 (DC1) to UC4 (DC4) of FIGS. 16B and 16C may be chamfered to form a curved plane or a flat plane.

In the above-mentioned modification, description is made as to the case in which the four leg portions UC1 (DC1) to UC4 (DC4) are disposed at the four corners of the rectangular (square) base cores UCb and DCb, but it is not always limited thereto. Namely, it may be sufficient if the four leg portions are disposed separately in pairs on the two straight lines that are diagonally intersecting each other on the base core. What is more, the shape and size of the base cores is not limited to square as shown in the above-mentioned embodiments and so on, and any other shape and size may be available as long as it functions as a base of the four leg portions.

[Second Modification]

Figure 17:
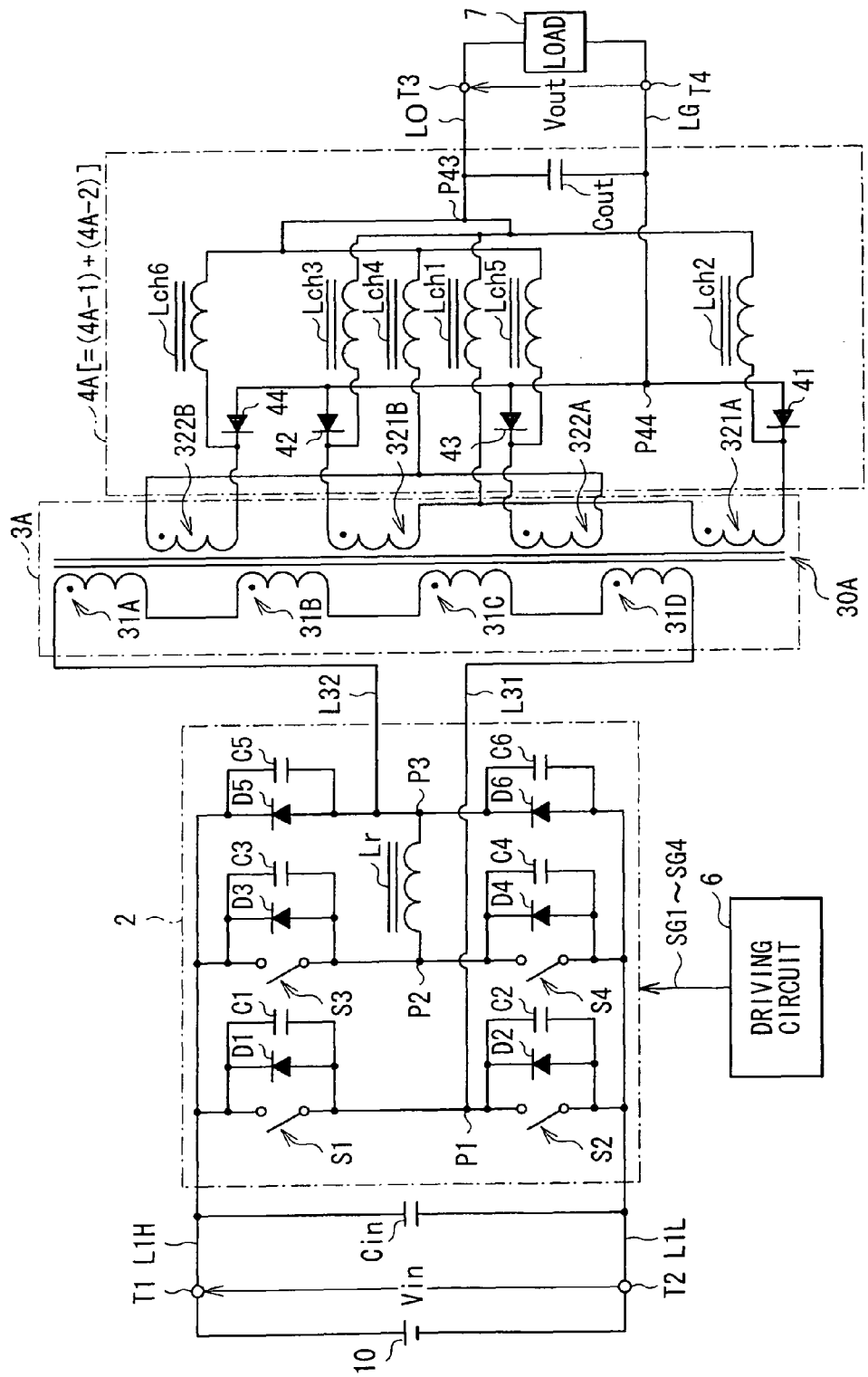
FIG. 17 is a circuit diagram showing a configuration (configuration of an equivalent circuit) of a switching power supply unit according to Modification 2 of the present invention.
Figure 18:
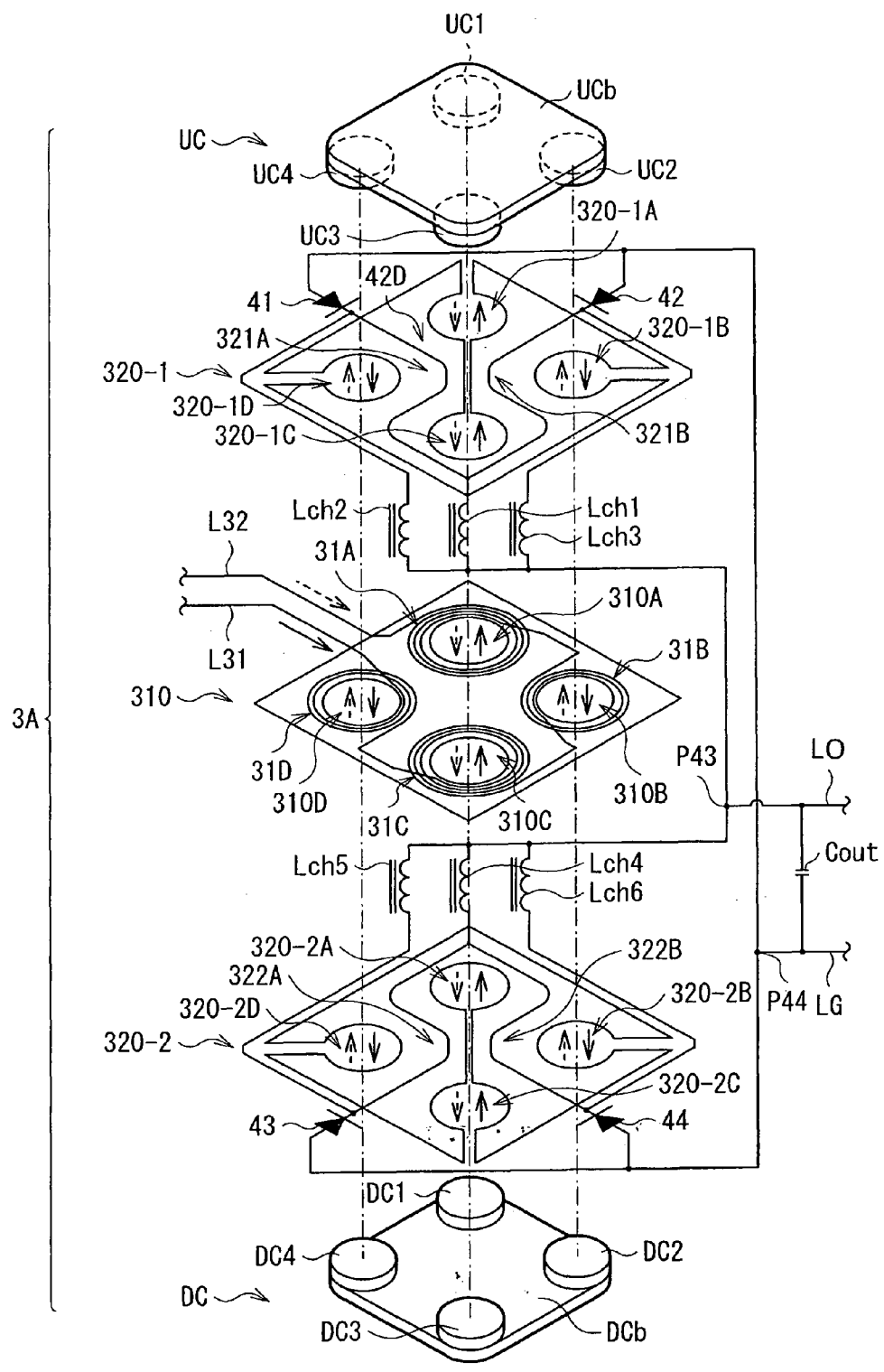
FIG. 18 is an exploded perspective view showing an external appearance configuration of a principal part of the transformer illustrated in FIG. 17.

FIG. 17 illustrates a configuration of a switching power supply unit (configuration of equivalent circuit) according to Modification 2 of the present invention. FIG. 18 is an exploded perspective view showing an external appearance configuration of a principal part of a transformer 3A according to Modification 2 of the present invention in addition to a circuit diagram of a peripheral circuit thereof. The switching power supply unit of the present modification employs the transformer 3A that is described in the switching power supply unit of the above-mentioned modification 1 together with a rectification smoothing circuit 4A to be described hereinbelow instead of the rectification smoothing circuit 4.

The rectification smoothing circuit 4A has four rectifier diodes 41 to 44, six choke coils Lch1 to Lch6, and one output smoothing capacitor Cout. Specifically, the cathode of the rectifier diode 41 is connected to one ends of the secondary winding 321A and the choke coil Lch2, and the anode thereof is connected to the connection point P44 on the ground line LG. The cathode of the rectifier diode 42 is connected to one ends of the secondary winding 321B and the choke coil Lch3, and the anode thereof is connected to the connection point P44. The cathode of the rectifier diode 43 is connected to one ends of the secondary winding 322A and the choke coil Lch5, and the anode thereof is connected to the connection point P44. The cathode of the rectifier diode 44 is connected to one ends of the secondary winding 322B and the choke coil Lch6, and the anode thereof is connected to the connection point P44. Namely, the anodes of these rectifier diodes 41 to 44 are mutually connected at the connection point P44 and are led to the ground line LG. In other words, the rectifier circuit constituted from the rectifier diodes 41 to 44 has a configuration of anode common connection.

Meanwhile, the other ends of the six choke coils Lch1 to Lch6 are mutually connected at the connection point P43. Specifically, one end of the choke coil Lch1 is connected to the other ends of the secondary windings 321A and 321B. One end of the choke coil Lch2 is connected to the cathode of the rectifier diode 41 and one end of the secondary winding 321A. One end of the choke coil Lch3 is connected to the cathode of the rectifier diode 42 and one end of the secondary winding 321B. The other ends of these choke coils Lch1 to Lch3 are mutually connected at the connection point P43 on the output line LO. Moreover, one end of the choke coil Lch4 is connected to the other ends of the secondary windings 322A and 322B. One end of the choke coil Lch5 is connected to the cathode of the rectifier diode 43 and one end of the secondary winding 322A. One end of the choke coil Lch6 is connected to the cathode of the rectifier diode 44 and one end of the secondary winding 322B. The other ends of these choke coils Lch4 to Lch6 are mutually connected at the connection point P43. The output smoothing capacitor Cout is arranged between the output line LO (connection point P43) and the ground line LG (connection point P44) as with the rectification smoothing circuit 4.

In this manner, the rectification smoothing circuit 4A of the present modification is configured such that the two rectifier diodes 41 and 42 and the three choke coils Lch1 to Lch3, which correspond respectively to the two rectifier diodes 41 and 42 and the three choke coils Lch0 to Lch2 of the rectification smoothing circuit 4 (FIG. 1), are connected in parallel with the two rectifier diodes 43 and 44 and the three choke coils Lch4 to Lch6. Namely, the rectification smoothing circuit 4A includes the first rectification smoothing circuit 4A-1 and the second rectification smoothing circuit 4A-2, and these circuits are connected in parallel. The first rectification smoothing circuit 4A-1 is configured from the rectifier diodes 41 and 42, the choke coils Lch1 to Lch3 and the first capacitative element Cout, and the second rectification smoothing circuit 4A-2 is configured from the rectifier diodes 43 and 44, the choke coils Lch4 to Lch6 and the first capacitative element Cout. The first capacitative element Cout is used in both the first rectification smoothing circuit 4A-1 and the second rectification smoothing circuit 4A-2. The primary windings 31A to 31D are implemented by the print coil 310 as the first conductive member, the secondary windings 321A and 321B are implemented by the metal plate 320-1 as the second conductive member, and the secondary windings 322A and 322B are implemented by the metal plate 320-2 as the third conductive member.

This modification corresponds to a specific example of the second switching power supply unit of the present invention, and the secondary windings 321A and 321B correspond to a specific example of the first and second secondary windings, respectively, and the secondary windings 322A and 322B correspond to a specific example of the third and fourth secondary windings, respectively. The rectifier diodes 41 to 44 correspond to a specific example of a "first to fourth rectifier devices" of the invention respectively, and the choke coils Lch1 to Lch6 correspond to a specific example of a "first to sixth choke coils" of the invention respectively.

With such configuration, effects similar to those of the above-mentioned embodiment and Modification 1 are available also in the present Modification due to the similar function thereof.

[Third Modification]

Figure 20:
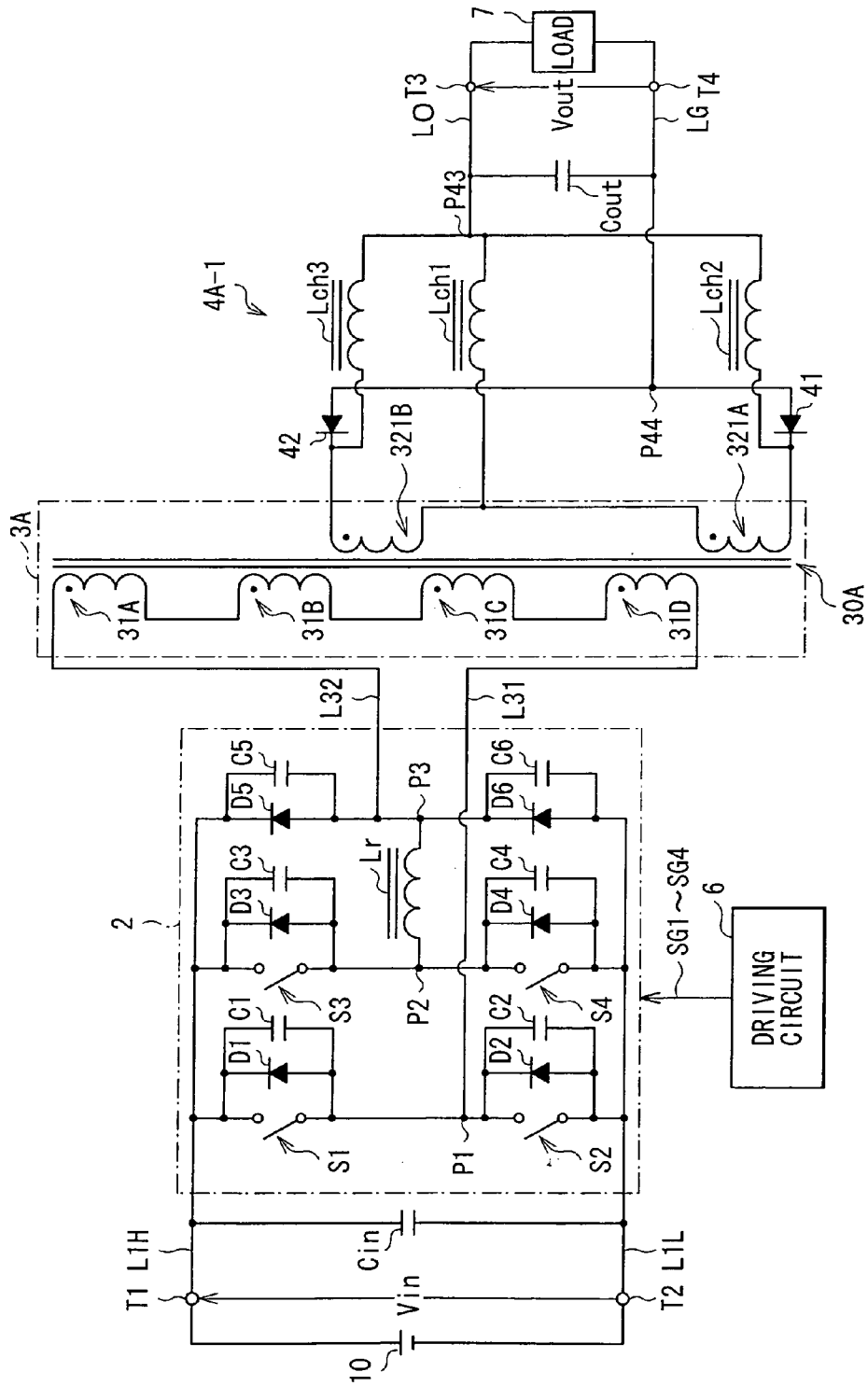
FIG. 20 is a circuit diagram showing a configuration (configuration of an equivalent circuit) of a switching power supply unit according to third modification of the present invention.
Figure 21:
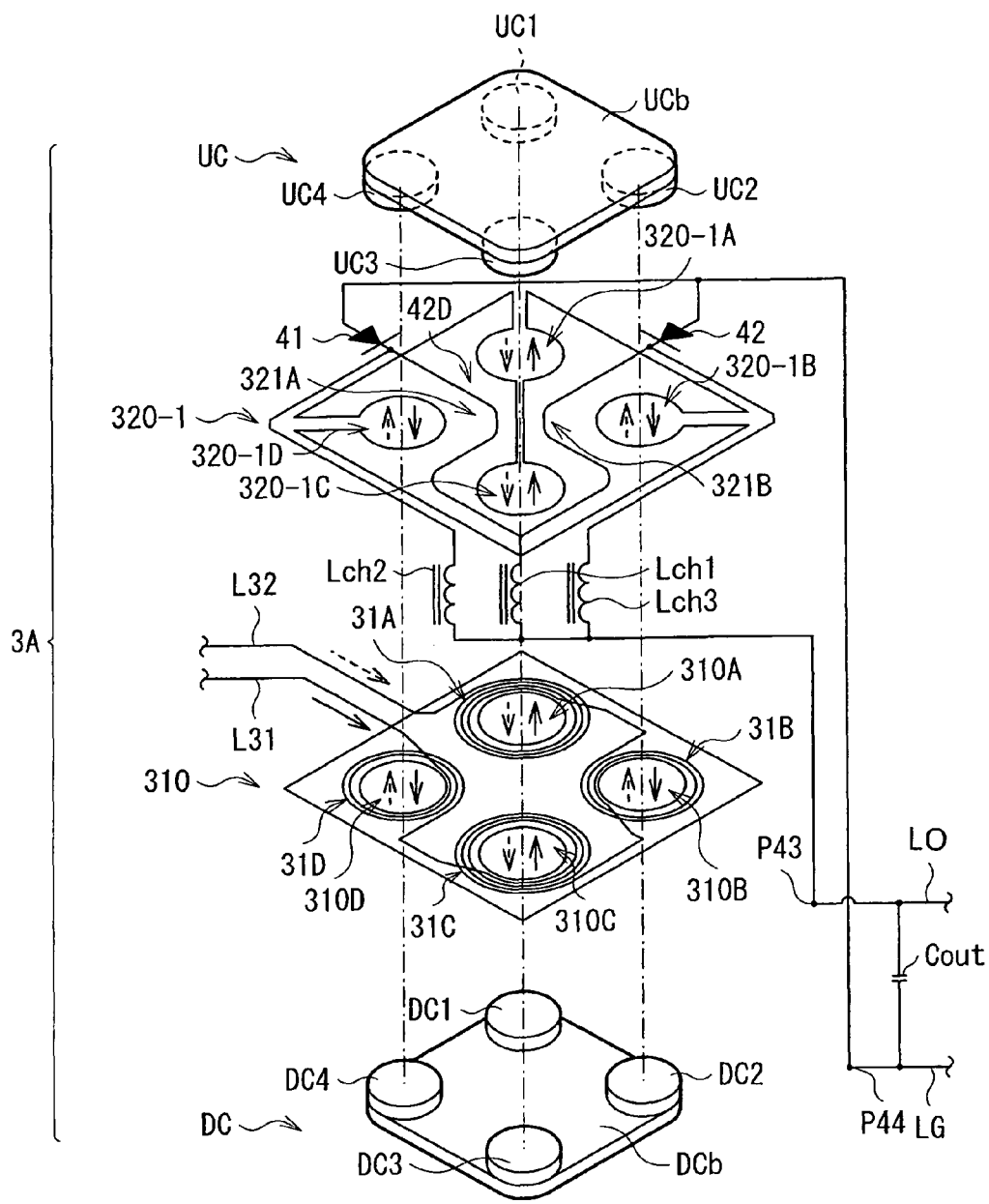
FIG. 21 is an exploded perspective view showing an external appearance configuration of a principal part of the transformer illustrated in FIG. 20.

In the second modification (FIGS. 17 and 18) of the present invention, two rectification smoothing circuits (the first rectification smoothing circuit 4A-1 and the second rectification smoothing circuit 4A-2) which are mutually connected in parallel, provided between the secondary side of the transformer and output terminals, and each of rectification smoothing circuits is implemented by utilizing a conductive member. However, as shown in FIGS. 20 and 21, for example, either one of rectification smoothing circuits may be provided, and the rectification smoothing circuit may be implemented by utilizing a single conductive member. In this case, in the scheme of circuit, a circuit of FIG. 20 and a circuit indicated in FIG. 1 are equivalent.

As shown in FIGS. 20 and 21 for example, only the first rectification smoothing circuit 4A-1 is provided, and it is implemented by utilizing the metal plate 320-1 as the second conductive member. Alternatively, only the second rectification smoothing circuit 4A-2 may be provided, and it may be implemented by utilizing the metal plate 320-2. In the first embodiment of the invention (FIG. 1), while a rectification smoothing circuit 4 is implemented by utilizing two metal plates 320-1 and 320-2. In contrast, in the third modification, the rectification smoothing circuit 4A-1 is implemented by utilizing only one metal plate. Therefore, the reduction of number of components is achievable.

Third modification corresponds to the first embodiment of the first switching power supply unit of the present invention, and the rectification smoothing circuit 4A-1 corresponds to a specific example of "rectification smoothing circuit". The secondary windings 321A and 321B correspond to a specific example of a "first secondary winding" and a "second secondary winding" of the invention respectively, the rectifier diodes 41 and 42 correspond to a specific example of a "first and second rectifier devices" of the invention respectively, the choke coils Lch1 to Lch3 correspond to a specific example of a "first to third choke coils" of the invention respectively, and the metal plate 320-1 which implements the secondary windings 321A and 321B corresponds to a specific example of the "second conductive member".

(Other Modifications)

Although the present invention has been described above with reference to the embodiment and modifications, the invention is not limited to the above-mentioned embodiment and modifications but may be variously modified.

For example, in the above-mentioned embodiment and so on, although the shape of the primary winding and the secondary winding is explained in detail, the shape thereof is not limited thereto and other shapes may be applicable. Further, the primary winding and the secondary windings may both be constituted from either a printed coil or a metal plate.

Figure 19:
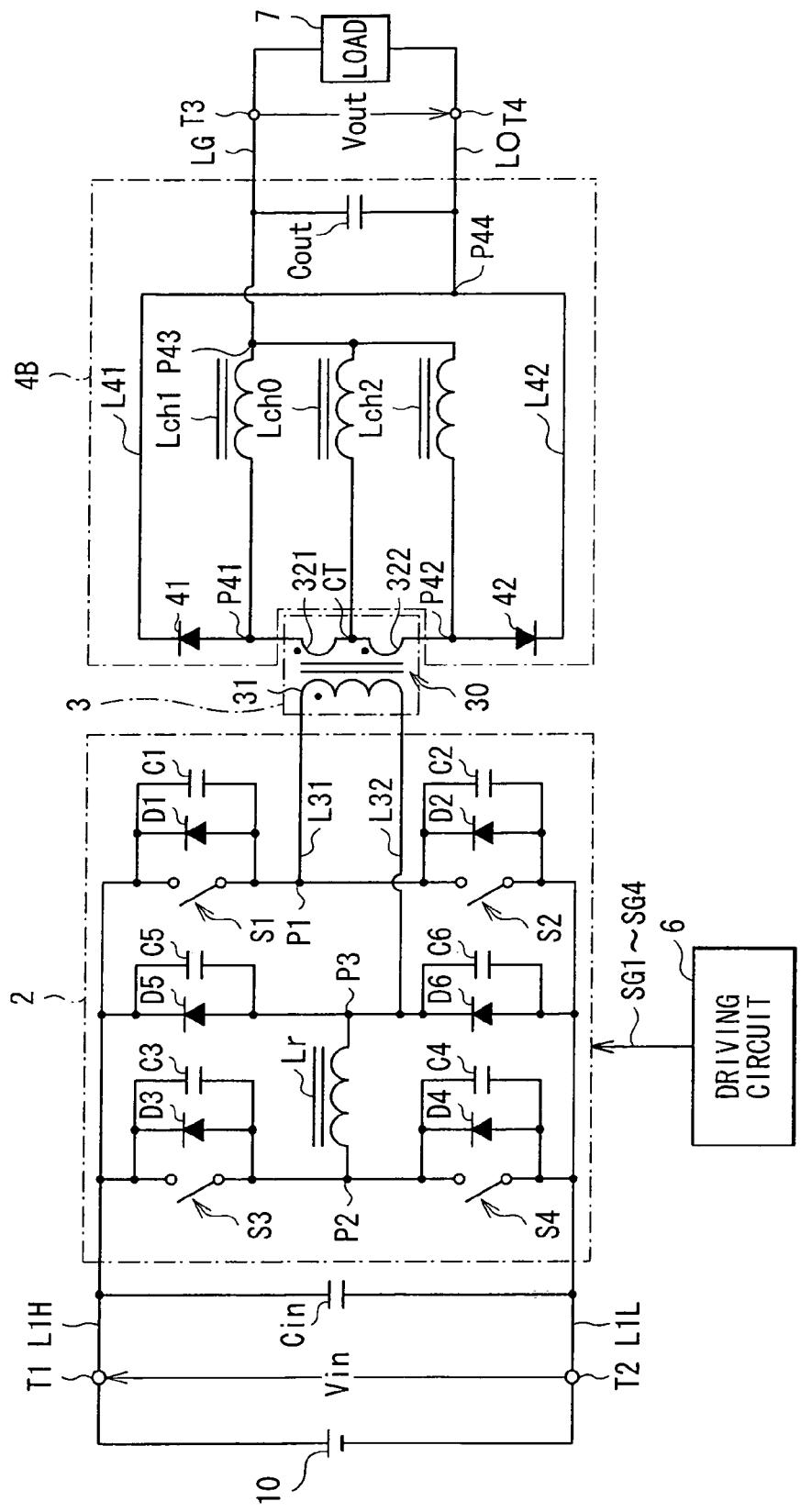
FIG. 19 is a circuit diagram showing a configuration of a switching power supply unit according to another modification of the present invention.

In addition, in the above-mentioned embodiment and so on, description is made as to the case in which the rectifier smoothing circuits 4 and 4A are configured such that a rectifier circuit, which is constituted from a plurality of rectifier diodes, is a type of anode common connection, but it is not limited thereto. Specifically, a rectifier circuit that is constituted from two rectifier diodes 41 and 42 may be a type of cathode common connection, as shown by the rectification smoothing circuit 4B of FIG. 19, for example. More specifically in this rectification smoothing circuit 4B, the anode of the rectifier diode 41 is connected to one ends of the secondary winding 321 and the choke coil Lch1 at the connection point P41, and the cathode thereof is connected to the connection point P44 (output terminal T4) on the output line LO via the connection line L41. The anode of the rectifier diode 42 is connected to one end of the secondary winding 322 and one end of the choke coil Lch2 at the connection point P42, and the cathode thereof is connected to the connection point P44 (output terminal T4) via the connection line L42. Namely, the anodes of the rectifier diodes 41 and 42 are connected each other at the connection point P44 and led to the ground line LO.

What is more, modifications and so on as described above may be combined variously.

The present application contains subject matter related to that disclosed in Japanese Priority Patent Application JP2009-146372 filed in the Japan Patent Office on Jun. 19, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A switching power supply unit converting a DC input voltage inputted from an input terminal pair into a DC output voltage, and outputting the generated DC output voltage from an output terminal pair, the switching power supply unit comprising:

23 a transformer including:
  a primary winding arranged on the input terminal pair side and a first and a second secondary windings arranged on the output terminal pair side, the first and a second secondary windings being connected in series to each other;
  a magnetic core including two base-plates facing each other and four legs provided between the two base-plates to couple the two base-plates together, the four legs including a first pair of legs on a first diagonal line and a second pair of legs on a second diagonal line, the first and second diagonal lines intersecting each other in a plane along facing surfaces of the two base-plates;
  a first conductive member having through-holes allowing the four respective legs to pass therethrough, and configuring the primary winding which is wound around the legs; and
  a second conductive member having through-holes allowing the four respective legs to pass therethrough, and configuring the first and second secondary windings which are wound around the legs;
an inverter circuit arranged between the input terminal pair and the primary winding, and including switching elements; and
a rectifying-smoothing circuit arranged between the output terminal pair and the first and second secondary windings, and including first and second rectifying elements, first to third choke coils, and a capacitive element arranged between the output terminal pair;
wherein
the first rectifying element is arranged between a first junction and one end of the capacitive element, the first junction being defined as a junction of one end of the first secondary winding and one end of the second choke coil;
the second rectifying element is arranged between a second junction and the one end of the capacitive element, the second junction being defined as a junction of one end of the second secondary winding and one end of the third choke coil;
a third junction is connected to the one end of the first choke coil, the third junction being defined as a junction of the other end of the first secondary winding and the other end of second secondary winding; and
a fourth junction is connected to the other end of the capacitive element, the fourth junction being defined as a junction of the other end of the first choke coil, the other end of the second choke coil and the other end of the third choke coil.

2. The switching power supply unit according to claim 1, wherein
an expression L1<L2=L3 is satisfied, where L1, L2 and L3 represent inductances of the first to third choke coils, respectively.

3. The switching power supply unit according to claim 1, wherein
a cathode of the first rectifying element is connected to the first junction while an anode thereof is connected to the one end of the capacitive element; and
a cathode of the second rectifying element is connected to the second junction while an anode thereof is connected to the one end of the capacitive element.

4. The switching power supply unit according to claim 1, wherein
an anode of the first rectifying element is connected to the first junction while a cathode thereof is connected to the one end of the capacitive element; and

24 an anode of the second rectifying element is connected to the second junction while a cathode thereof is connected to the one end of the capacitive element.

5. The switching power supply unit according to claim 1, wherein the inverter circuit is a switching circuit of full bridge type including four switching elements.

6. The switching power supply unit according to claim 1, wherein
the primary winding in the transformer is wound around so that:
closed magnetic paths are formed inside the magnetic core from the four legs to the two base-plates due to currents which flow through the primary winding;
a first couple of magnetic fluxes respectively generated inside the first couple of legs are both directed in a first direction; and
a second couple of magnetic fluxes respectively generated inside the second couple of legs are both directed in a second direction which is opposite to the first direction.

7. The switching power supply unit according to claim 1, wherein
the primary winding in the transformer is wound around so that:
closed magnetic paths are formed inside the magnetic core from the four legs to the two base-plates due to currents which flow through the primary winding, the four closed magnetic paths each passing through both adjacent two of the four legs and the two base-plates and then returning.

8. The switching power supply unit according to claim 1, wherein
the transformer includes
a third conductive member having through-holes allowing the four respective legs to pass therethrough, and configuring the second secondary winding which is wound around the legs.

9. The switching power supply unit according to claim 8, wherein
the primary winding in the transformer is wound around so that:
closed magnetic paths are formed inside the magnetic core from the four legs to the two base-plates due to currents which flow through the primary winding, the four closed magnetic paths each passing through both adjacent two of the four legs and the two base-plates and then returning.

10. A switching power supply unit converting a DC input voltage inputted from an input terminal pair into a DC output voltage, and outputting the generated DC output voltage from an output terminal pair, the switching power supply unit comprising:
a transformer including:
  a primary winding arranged on the input terminal pair side and first to fourth secondary windings arranged on the output terminal pair side, the first to fourth secondary windings being connected in series to each other;
  a magnetic core including two base plates facing each other and four legs provided between the two base-plates to couple the two base-plates together, the four legs including a first pair of legs on a first diagonal line and a second pair of legs on a second diagonal line, the first and second diagonal lines intersecting each other in a plane along facing surfaces of the two base-plates;

a first conductive member having through-holes allowing the four respective legs to pass therethrough, and configuring the primary winding which is wound around the legs;

a second conductive member having through-holes allowing the four respective legs to pass therethrough, and configuring the first and second secondary windings which are wound around the legs; and a third conductive member having through-holes allowing the four respective legs to pass therethrough, and configuring the third and fourth secondary windings which are wound around the legs;

an inverter circuit arranged between the input terminal pair and the primary winding, and including switching elements; and a first rectifying-smoothing circuit arranged between the output terminal pair and the first and second secondary windings, and including first and second rectifying elements, first to third choke coils, and a first capacitive element arranged between the output terminal pair; and a second rectifying-smoothing circuit arranged between the output terminal pair and the third and fourth secondary windings in parallel with the first rectifying-smoothing circuit, and including third and fourth rectifying elements, fourth to sixth choke coils, and a second capacitive element arranged between the output terminal pair;

wherein the first rectifying element is arranged between a first junction and one end of the capacitive element, the first junction being defined as a junction of one end of the first secondary winding and one end of the second choke coil, the second rectifying element is arranged between a second junction and the one end of the capacitive element, the second junction being defined as a junction of one end of the second secondary winding and one end of the third choke coil, a third junction is connected to the one end of the first choke coil, the third junction being defined as a junction of the other end of the first secondary winding and the other end of second secondary winding, a fourth junction is connected to the other end of the capacitive element, the fourth junction being defined as a junction of the other end of the first choke coil, the other end of the second choke coil and the other end of the third choke coil, the third rectifying element is arranged between a fifth junction and one end of the second capacitive element, the fifth junction being defined as a junction of one end of the third secondary winding and one end of the fifth choke coil, the fourth rectifying element is arranged between a sixth junction and the one end of the second capacitive element, the sixth junction being defined as a junction of one end of the fourth secondary winding and one end of the sixth choke coil, a seventh junction is connected to the one end of the fourth choke coil, the seventh junction being defined as a junction of the other end of the third secondary winding and the other end of fourth secondary winding, and an eighth junction is connected to the other end of the first capacitive element, the eighth junction being defined as a junction of the other end of the fourth choke coil, the other end of the fifth choke coil and the other end of the sixth choke coil.

11. The switching power supply unit according to claim 10, wherein the primary winding in the transformer is wound around so that:

closed magnetic paths are formed inside the magnetic core from the four legs to the two base-plates due to currents which flow through the primary winding;

a first couple of magnetic fluxes respectively generated inside the first couple of legs are both directed in a first direction; and a second couple of magnetic fluxes respectively generated inside the second couple of legs are both directed in a second direction which is opposite to the first direction.

12. The switching power supply unit according to claim 10, wherein the primary winding in the transformer is wound around so that:

closed magnetic paths are formed inside the magnetic core from the four legs to the two base-plates due to currents which flow through the primary winding, the four closed magnetic paths each passing through both adjacent two of the four legs and the two base-plates and then returning.

13. The switching power supply unit according to claim 8, wherein the primary winding in the transformer is wound around so that:

closed magnetic paths are formed inside the magnetic core from the four legs to the two base-plates due to currents which flow through the primary winding;

a first couple of magnetic fluxes respectively generated inside the first couple of legs are both directed in a first direction; and a second couple of magnetic fluxes respectively generated inside the second couple of legs are both directed in a second direction which is opposite to the first direction.

* * * * *